United States Patent [19]

Enomoto et al.

[11] Patent Number: 5,877,901
[45] Date of Patent: Mar. 2, 1999

[54] SUPER WIDE-ANGLE ZOOM LENS

[75] Inventors: Takashi Enomoto; Takayuki Ito, both of Tokyo, Japan

[73] Assignee: Asahi Kogaku Kogyo Kabushiki Kaisha, Tokyo, Japan

[21] Appl. No.: 761,789

[22] Filed: Dec. 6, 1996

[30] Foreign Application Priority Data

Dec. 12, 1995 [JP] Japan ..................................... 7-323392

[51] Int. Cl.[6] .................................................. G02B 15/14
[52] U.S. Cl. .......................... 359/691; 359/681; 359/682; 359/683; 359/689; 359/725; 359/740
[58] Field of Search ................................... 359/681, 682, 359/691, 740, 689, 683, 664, 725

[56] References Cited

U.S. PATENT DOCUMENTS

| | | |
|---|---|---|
| 3,966,306 | 6/1976 | Okudaira . |
| 4,153,339 | 5/1979 | Tajima et al. . |
| 4,159,865 | 7/1979 | Kawamura et al. . |
| 4,189,212 | 2/1980 | Mizutani et al. . |
| 4,196,968 | 4/1980 | Itoh .......................................... 359/691 |
| 4,196,969 | 4/1980 | Itoh . |
| 4,198,128 | 4/1980 | Ogino . |
| 4,364,641 | 12/1982 | Mogami . |
| 4,406,523 | 9/1983 | Sato et al. . |
| 4,477,153 | 10/1984 | Suda et al. . |
| 4,540,249 | 9/1985 | Mogami . |
| 4,726,665 | 2/1988 | Itoh . |
| 4,733,952 | 3/1988 | Fujioka ................................... 359/681 |
| 4,735,493 | 4/1988 | Tachihara . |
| 4,781,446 | 11/1988 | Tanaka et al. ........................... 359/681 |
| 4,844,599 | 7/1989 | Ito . |
| 4,934,797 | 6/1990 | Hirakawa . |
| 5,329,401 | 7/1994 | Sato ........................................ 359/689 |
| 5,371,631 | 12/1994 | Takada . |
| 5,434,710 | 7/1995 | Zozawa .................................. 359/689 |
| 5,631,775 | 5/1997 | Shibata ................................... 359/689 |
| 5,724,193 | 3/1998 | Hirakawa ............................... 359/691 |

FOREIGN PATENT DOCUMENTS

| | | |
|---|---|---|
| 0563615 | 10/1993 | European Pat. Off. . |
| 0620467 | 10/1994 | European Pat. Off. . |
| 1523492 | 9/1978 | United Kingdom . |
| 1576189 | 10/1980 | United Kingdom . |

OTHER PUBLICATIONS

"Handbook of Optics: vol. 1 (Sec. Ed.), "Michael Bass (Editor in Chief), McGraw–Hill, Inc., New York, NY, pp. 1.80–1.83, 1995.

"Optics: Second Edition, "Eugene Hecht, Addison–Wesley Publishing Company, Reading, Massachusetts, pp. 198–202, 1987.

United Kingdom Search Report.

Primary Examiner—Georgia Epps
Assistant Examiner—Evelyn A. Lester
Attorney, Agent, or Firm—Greenblum & Bernstein, P.L.C.

[57] ABSTRACT

A super wide-angle zoom lens includes at least a negative first lens group and a positive second lens group, in this order from an object side. A zooming operation is carried out by relatively moving the lens groups. When a photographing area is defined by a rectangular area, a boundary of a circular image forming area formed by the zoom lens is at least partially disposed in the rectangular photographing area at the shortest focal length of the zoom lens.

14 Claims, 18 Drawing Sheets

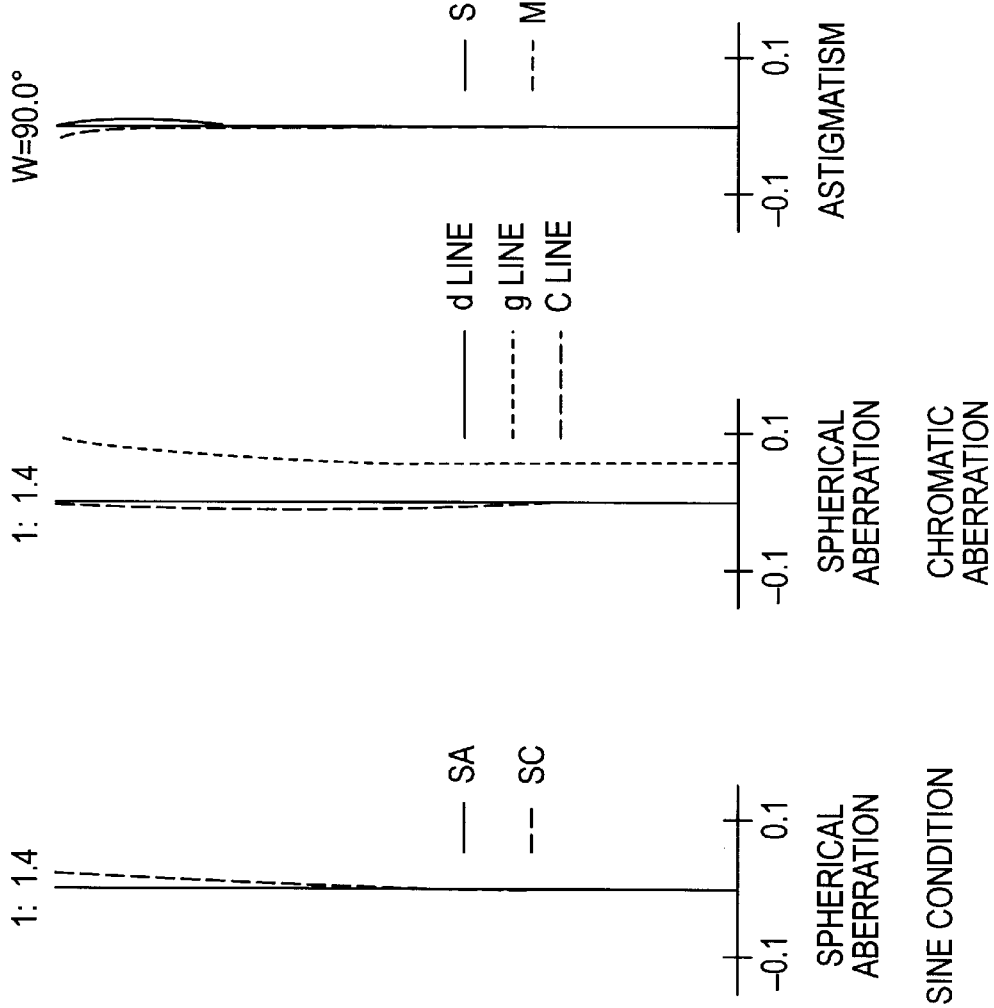

FIG. 3A
1: 1.4
— SA
-- SC
−0.1  0.1
SPHERICAL ABERRATION
SINE CONDITION
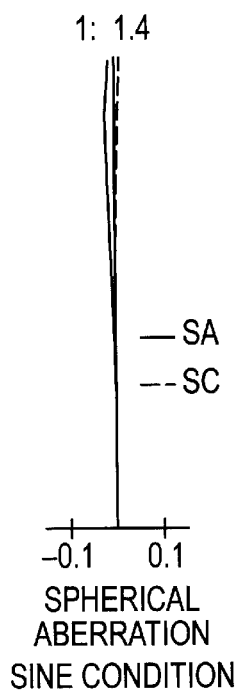
FIG. 3B
1: 1.4
— d LINE
---- g LINE
— — C LINE
−0.1  0.1
SPHERICAL ABERRATION
CHROMATIC ABERRATION
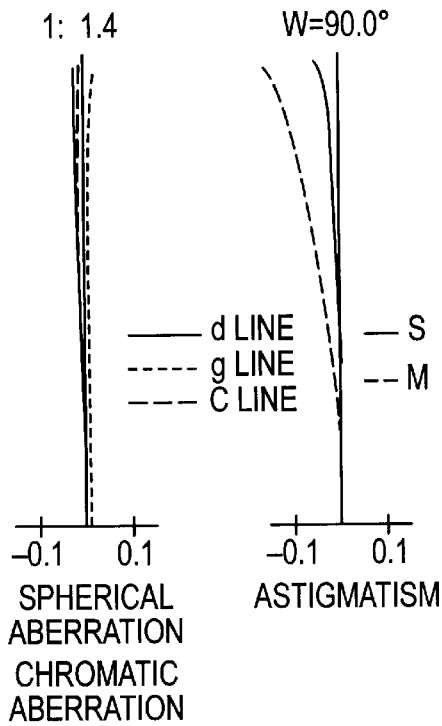
FIG. 3C
W=90.0°
— S
-- M
−0.1  0.1
ASTIGMATISM
FIG. 3D
W=90.0°
(y =−2.82)
−100  100 %
DISTORTION
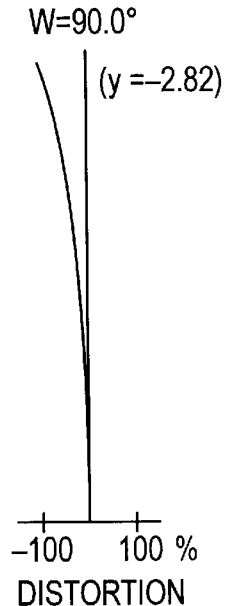
FIG. 4A
1: 1.5
— SA
-- SC
−0.1  0.1
SPHERICAL ABERRATION
SINE CONDITION
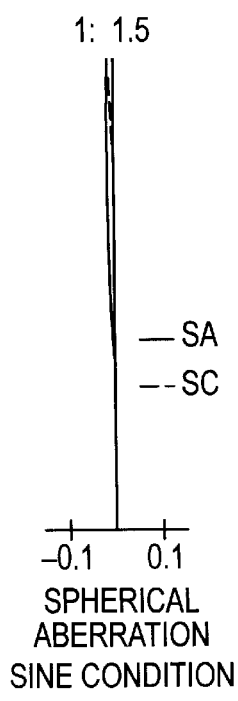
FIG. 4B
1: 1.5
— d LINE
---- g LINE
— — C LINE
−0.1  0.1
SPHERICAL ABERRATION
CHROMATIC ABERRATION
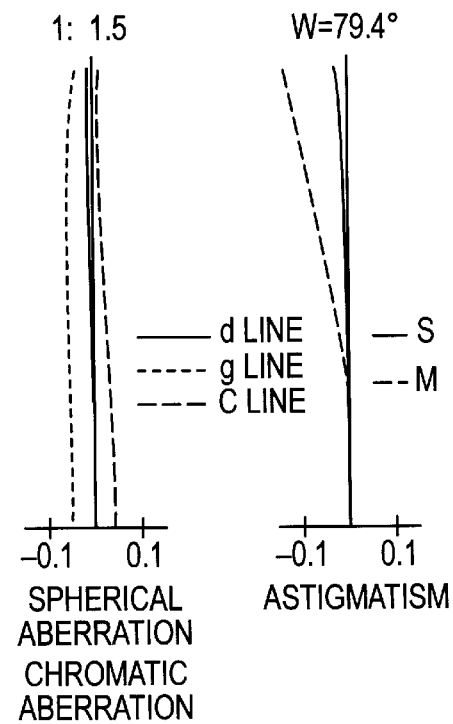
FIG. 4C
W=79.4°
— S
-- M
−0.1  0.1
ASTIGMATISM
FIG. 4D
W=79.4°
(y =−3.50)
−100  100 %
DISTORTION
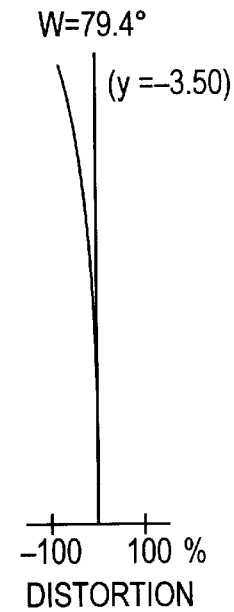

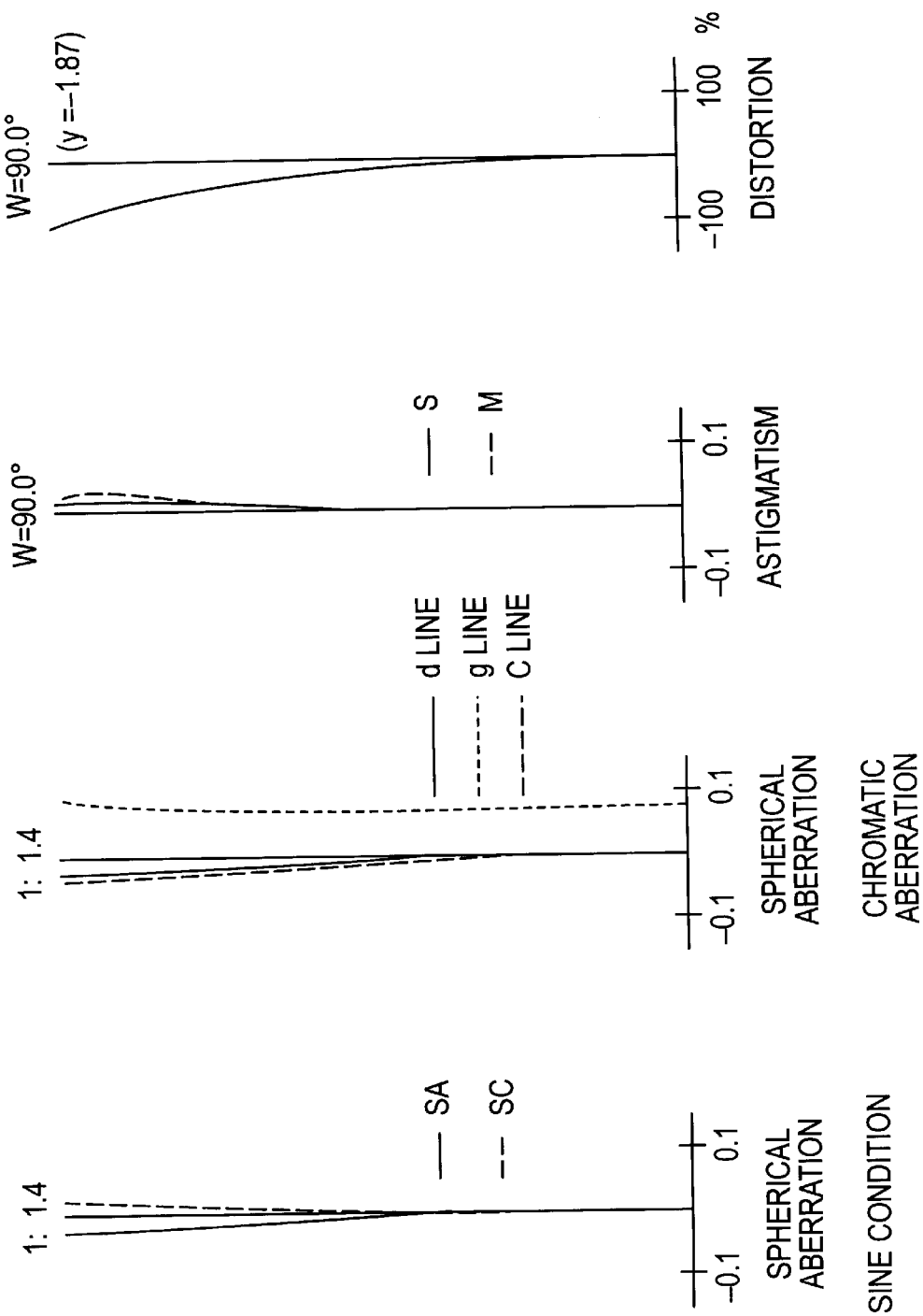

1: 1.4

—— SA
-- SC

-0.1  0.1
SPHERICAL
ABERRATION
SINE CONDITION

1: 1.4

—— d LINE
---- g LINE
--- C LINE

-0.1  0.1
SPHERICAL
ABERRATION
CHROMATIC
ABERRATION

W=90.0°

—— S
-- M

-0.1  0.1
ASTIGMATISM

W=90.0°

(y =-2.75)

-100  100 %
DISTORTION

1: 1.4

—— SA
-- SC

-0.1  0.1
SPHERICAL
ABERRATION
SINE CONDITION

1: 1.4

—— d LINE
---- g LINE
--- C LINE

-0.1  0.1
SPHERICAL
ABERRATION
CHROMATIC
ABERRATION

W=83.6°

—— S
-- M

-0.1  0.1
ASTIGMATISM

W=83.6°

(y =-3.50)

-100  100 %
DISTORTION

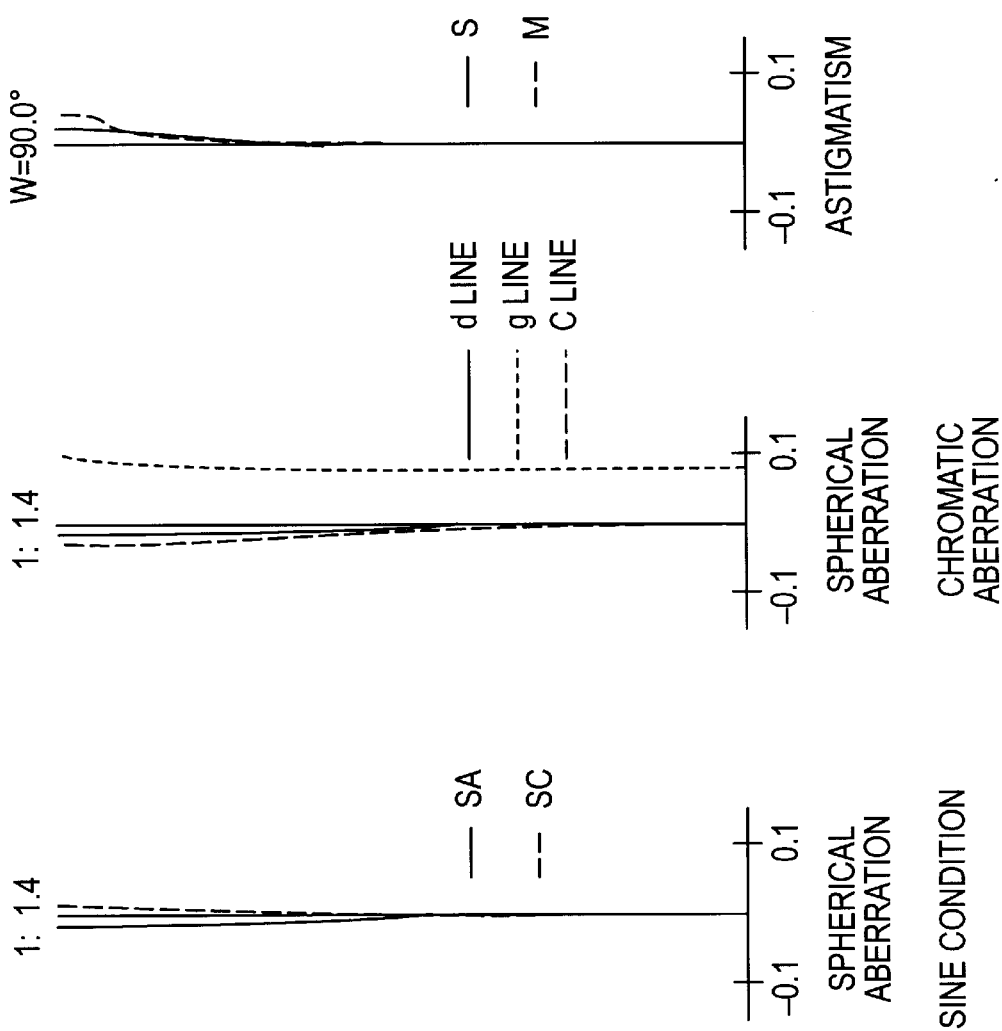

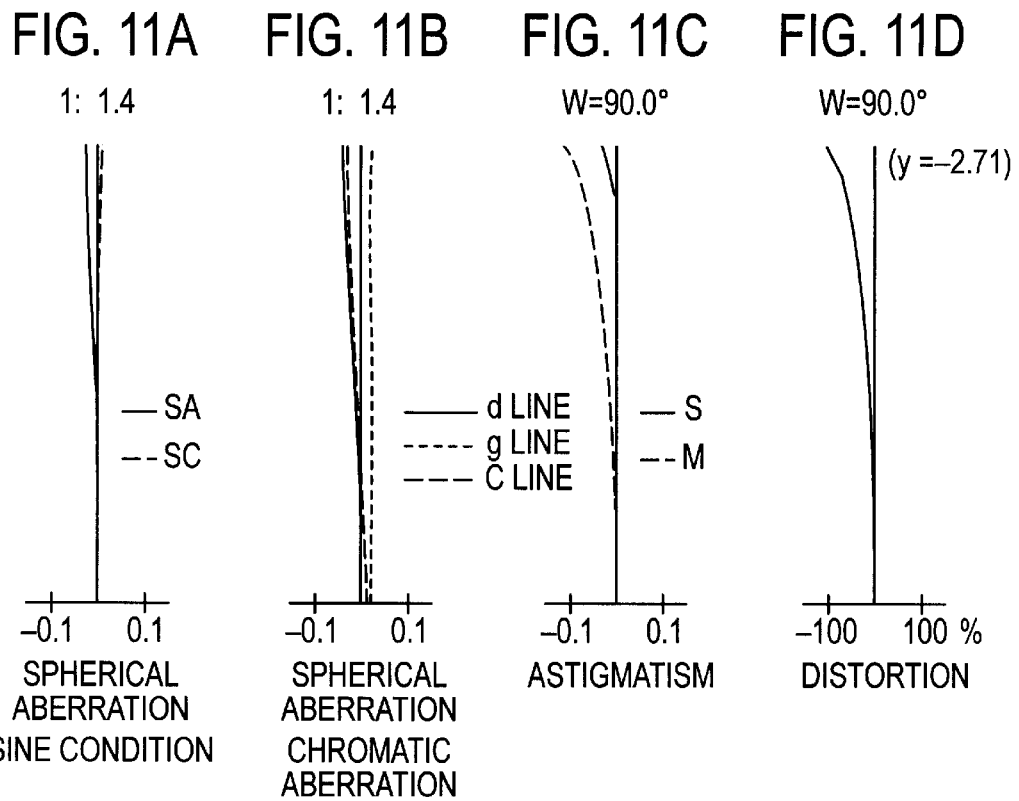

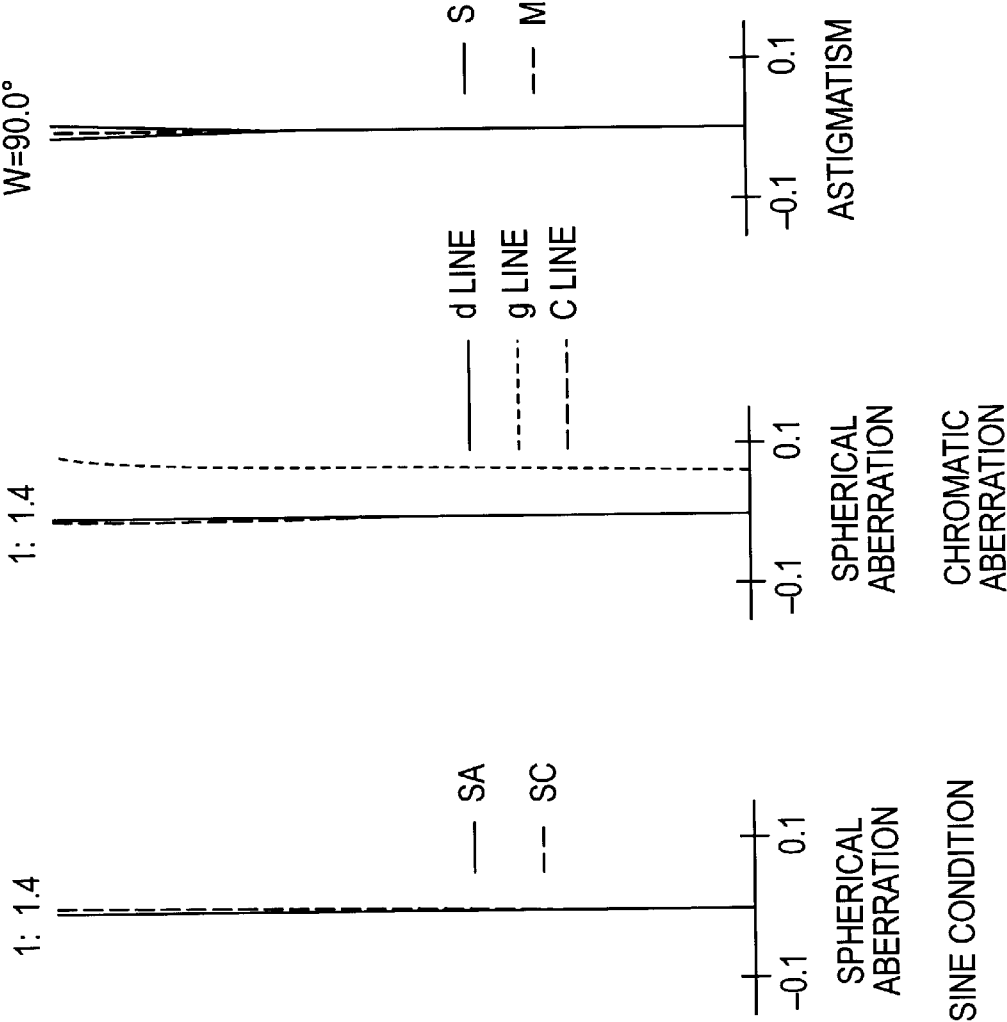

1: 1.4

-0.1 0.1
SPHERICAL
ABERRATION
SINE CONDITION

— SA
-- SC

1: 1.4

-0.1 0.1
SPHERICAL
ABERRATION
CHROMATIC
ABERRATION

—— d LINE
---- g LINE
--- C LINE

W=90.0°

-0.1 0.1
ASTIGMATISM

— S
-- M

W=90.0°
(y =-2.52)

-100 100 %
DISTORTION

1: 1.4

-0.1 0.1
SPHERICAL
ABERRATION
SINE CONDITION

— SA
-- SC

1: 1.4

-0.1 0.1
SPHERICAL
ABERRATION
CHROMATIC
ABERRATION

—— d LINE
---- g LINE
--- C LINE

W=89.0°

-0.1 0.1
ASTIGMATISM

— S
-- M

W=89.0°
(y =-3.20)

-100 100 %
DISTORTION

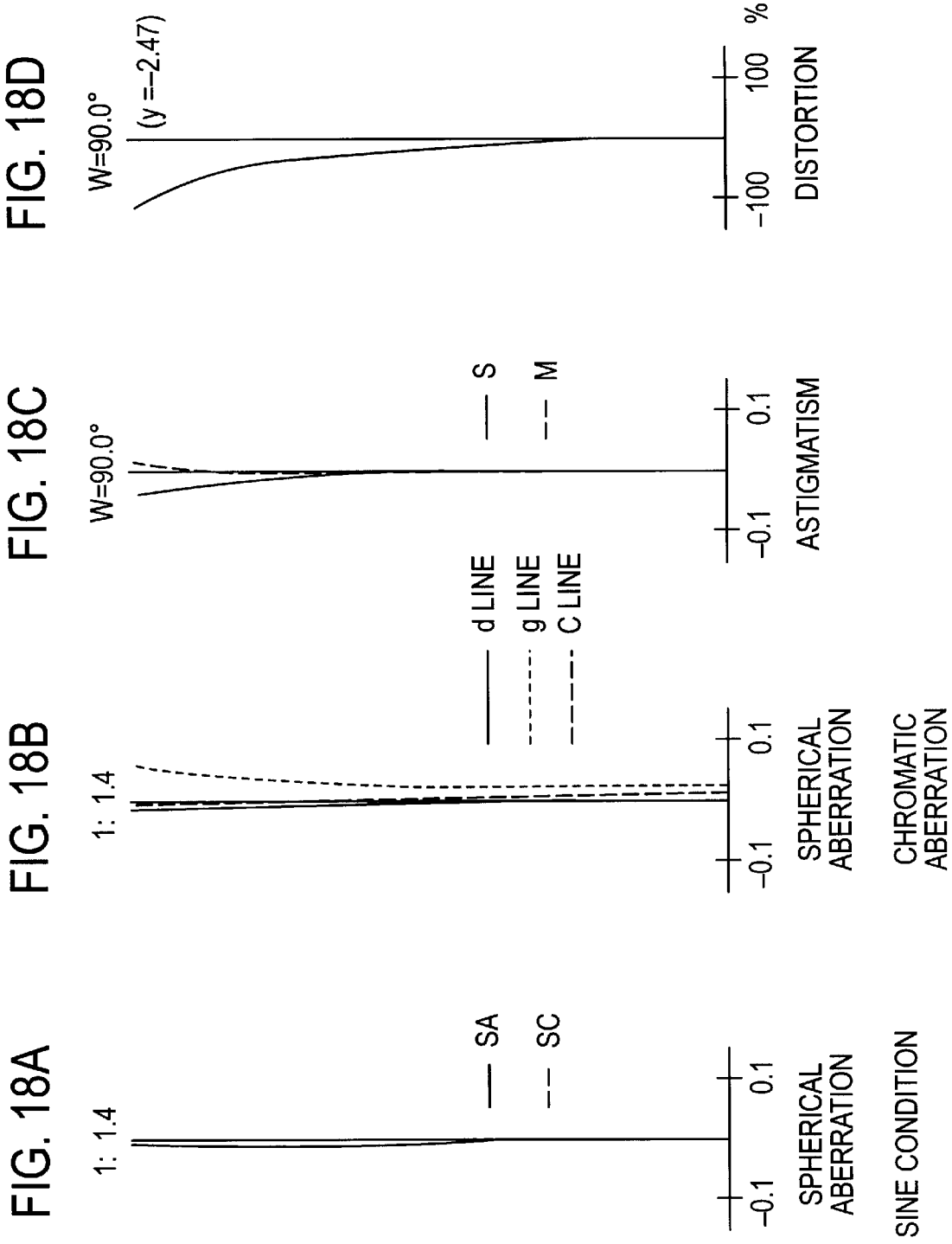

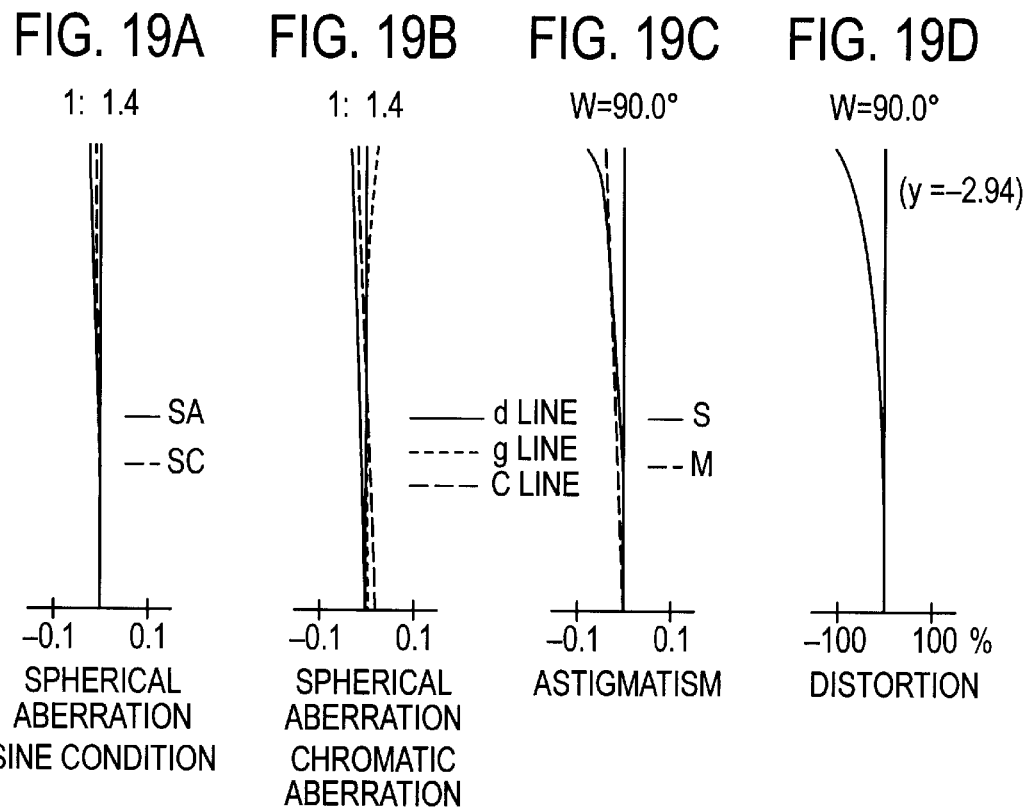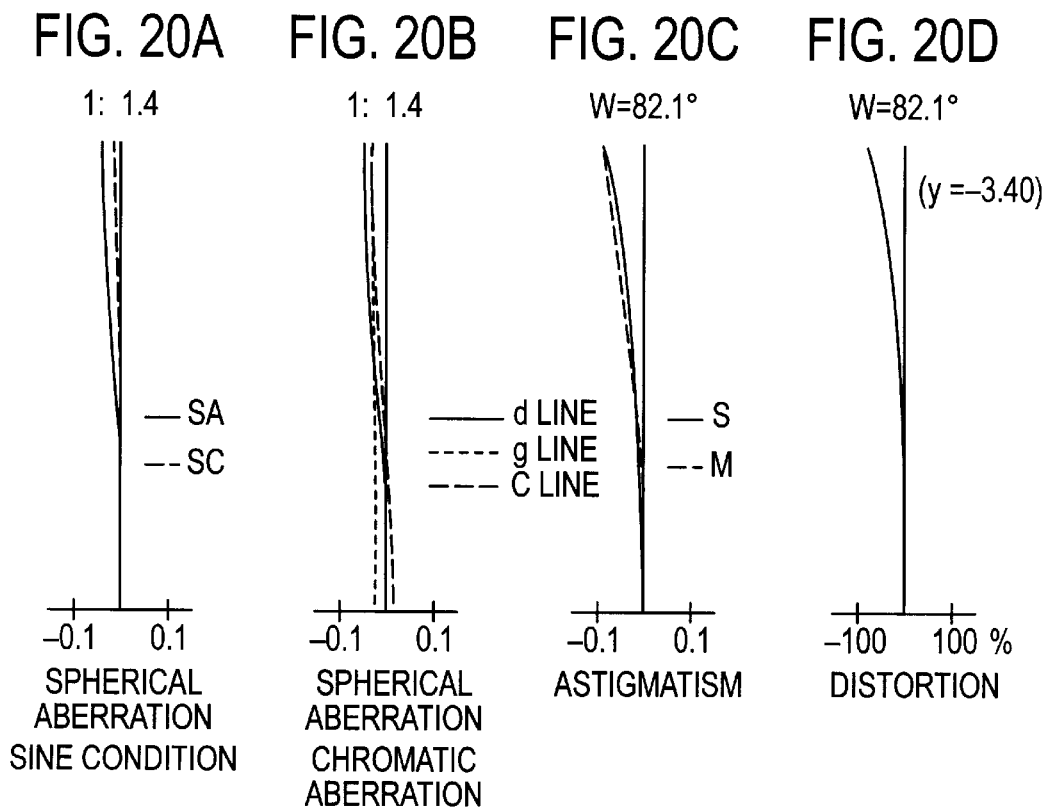

TELE

WIDE

TELE

SUPER WIDE-ANGLE ZOOM LENS

BACKGROUND OF THE INVENTION

1. Field of the Invention

The present invention relates to a zoom lens which an be used with a CCTV camera (monitoring camera) or with a photographing camera. More particularly, the present invention relates to a super wide-angle zoom lens in which the angle of view at the wide-angle extremity is approximately identical to that of a fish-eye lens.

2. Description of the Related Art

At present no wide-angle zoom lens is available for a CCTV camera which is capable of monitoring at an extremely wide-angle. In a known photographing lens, the maximum angle of view is provided by a "diagonal fish-eye lens" and is defined as a radius of circular image formed by the lens being approximately identical to a diagonal of a rectangular aperture to restrict an image area (rectangular picture area).

SUMMARY OF THE INVENTION

It is an object of the present invention to provide a super wide-angle zoom lens which can be used for monitoring at an extremely wide-angle on a rectangular picture area, or in which a special picture creation effect or composition can be obtained.

According to the present invention, there is provided a super wide-angle zoom lens having at least two lens groups which includes a first lens group having negative power and a second lens group having positive power, in this order from the object side. A zooming operation is carried out by relatively moving the lens groups. When a photographing area is defined by a rectangular area (aperture), the shortest focal length of the zoom lens is set such that at least a part of a boundary of a circular image formed by the zoom lens is disposed in the rectangular picture area. The photographing area is disposed in the circular image forming area at the longest focal length.

In conventional photographing lenses used for taking a photograph or for a CCTV camera, a rectangular photographing area is formed in a circular image forming area formed by the photographing lens, regardless of the focal length. Namely, the photographing area is totally filled with an object image. Conversely, in the super wide-angle zoom lens according to the present invention, the shortest focal length is set such that at least a part of the boundary (edge) of the circular image forming area is contained in the rectangular photographing area. In other words, the portion outside the boundary of the circular image forming area within the photographing area is a blank area in which no image is formed. Consequently, a wide-angle area in the picture area can be monitored by a CCTV camera, or a special image creation effect (composition) can be obtained in a camera.

It is preferable that the zoom lens satisfies the following condition (1):

$$0.1 < f_s / |f_{1G}| < 0.6 \tag{1}$$

wherein;

$f_s$ represents the focal length of the whole lens system at the short focal length extremity, and $f_{1G}$ represents the focal length of the first lens group.

The super wide-angle zoom lens can further consist of a diaphragm and a third lens group having positive power, arranged in this order behind the second lens group from the object side. Upon zooming, the first and second lens groups are moved, while no movement of the third lens group takes place. The zoom lens satisfies the following condition (2):

$$D_W / |f_{1G}| > 1.3 \tag{2}$$

wherein;

$D_W$ represents the spatial distance between the first lens group and the second lens group at the short focal length extremity.

The first lens group having negative power preferably consists of a negative first lens element, a negative second lens element, and a positive or negative sub-lens group, in this order from the object side. The zoom lens satisfies the following condition (3):

$$0.5 < f_{1-2} / f_1 < 0.9 \tag{3}$$

wherein;

$f_{1-2}$ represents the resultant focal length (<0) of the first and second lens elements of the first lens group, and $f_1$ represents the focal length (<0) of the first lens element of the first lens group.

Preferably, the third sub-lens group for lens sub group of the first lens group is made of a cemented lens assembly of a negative lens and a positive lens cemented thereto.

According to another aspect of the present invention, the super wide-angle zoom lens consists of a first lens group having negative power, a second lens group having positive power, a diaphragm and a third lens group having positive power, in this order from the object side. Upon zooming, the first and second lens groups are moved, while no movement of the third lens group takes place. The zoom lens satisfies relationship (2).

According to yet a further aspect of the present invention, there is provided a super wide-angle zoom lens having at least two lens groups of a first lens group having negative power and a second lens group having positive power, in this order from the object side, wherein the zooming operation is carried out by relatively moving the lens groups. When a photographing area is defined by a rectangular area (aperture), the half-angle of view at the shortest focal length on the minor side of the rectangular photographing area is equal to or greater than 60°. The half angle of view on the minor side corresponds to a minimum distance between a center and a major side of the rectangular photographing area.

According to still another aspect of the present invention, there is provided a super wide-angle zoom lens having at least two lens groups of a first lens group having negative power and a second lens group having positive power, in this order from the object side, wherein the zooming operation is carried out by relatively moving the lens groups. When a photographing area is defined by a rectangular area, the half-angle of view at the shortest focal length on the major side of the rectangular photographing plane is equal to or greater than 75°. The half angle of view on the major side corresponds to a minimum distance between a center and the minor side of the rectangular photographing area. The ratio of length between the minor side (vertical) and the major side (horizontal) is, for example, approximately 2:3.

The present disclosure relates to subject matter contained in Japanese Patent Application No. 07-323392 (filed on Dec. 12, 1995) which is expressly incorporated herein by reference in its entirety.

BRIEF DESCRIPTION OF THE DRAWINGS

The invention will be described below in detail with reference to the attached drawings, in which similar reference numerals indicate similar elements, and in which:

FIGS. 2A through 2D are aberration diagrams of the lens system shown in FIG. 1 at the shortest focal length extremity thereof;

FIGS. 3A through 3D are aberration diagrams of the lens system shown in FIG. 1 at an intermediate focal length thereof;

FIGS. 4A through 4D are aberration diagrams of the lens system shown in FIG. 1 at a longest focal length extremity thereof;

FIGS. 6A through 6D are aberration diagrams of the lens system shown in FIG. 5 at the shortest focal length extremity thereof;

FIGS. 10A through 10D are aberration diagrams of the lens system shown in FIG. 9 at the shortest focal length extremity thereof;

FIGS. 11A through 11D are aberration diagrams of the lens system shown in FIG. 9 at an intermediate focal length thereof;

FIGS. 12A through 12D are aberration diagrams of the lens system shown in FIG. 9 at a longest focal length extremity thereof;

FIGS. 14A through 14D are aberration diagrams of the lens system shown in FIG. 13 at the shortest focal length extremity thereof;

FIGS. 18A through 18D are aberration diagrams of the lens system shown in FIG. 17 at the shortest focal length extremity thereof;

FIGS. 19A through 19D are aberration diagrams of the lens system shown in FIG. 17 at an intermediate focal length thereof;

FIGS. 20A through 20D are aberration diagrams of the lens system shown in FIG. 17 at a longest focal length extremity thereof;

DESCRIPTION OF THE PREFERRED EMBODIMENTS

Figure 23:
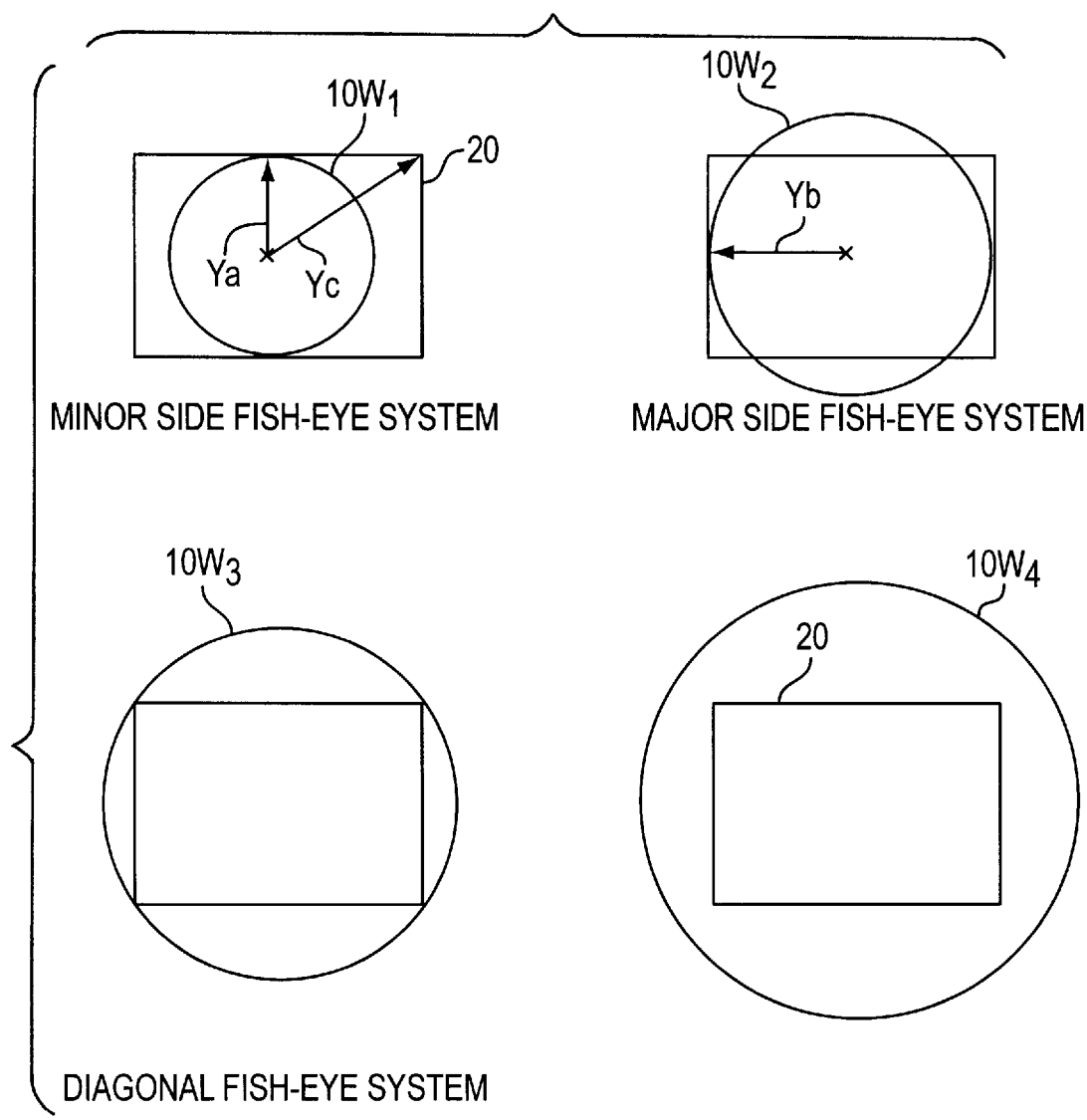
FIG. 23 is a schematic view of picture areas (approximately 2 (vertical):3 (horizontal)) where the angle of view varies during a zooming operation between the shortest focal length and the longest focal length, in a super wide-angle zoom lens applied to a CCTV camera or a photographing camera, according to the present invention.

FIG. 23 shows a condition between an imaging area and a picture area (photographing area) which is varied by the super wide-angle zoom lens of the present invention. The image forming area $10W_1$–$10W_4$ formed by the super wide-angle zoom lens is circular, as in a conventional photographing lens. According to the present invention, if the picture area (photographing area) 20 is defined by a rectangular photographing frame, for example by a standard rectangular photographing frame of 2 (vertical):3 (horizontal), at least a part of the peripheral boundary (edge) of the circular image forming area 10W is located in the rectangular picture area 20 at the shortest focal length. At the longest focal length, the picture area 20 is contained in the circular image forming area.

In the embodiment shown in FIG. 23, the circular image forming area $10W_1$ at the shortest focal length is entirely contained in the photographing picture area 20 (i.e., the diameter of the circular image forming area $10W_1$ is identical to the length of the minor side of the rectangular picture area 20). Hereinafter this will be referred to as a "minor side fish-eye system". As the focal length increases, the diameter of the image forming area changes ($10W_1 \rightarrow 10W_2 \rightarrow 10W_3 \rightarrow 10W_4$). The image forming area $10W_2$ in which the diameter of the circular image forming area $10W_2$ is substantially identical to the length of the major side of the rectangular picture area 20, is referred to as a "major side fish-eye system". The image forming area $10W_3$ in which the diameter thereof is substantially identical to the diagonal of the rectangular picture area 20, is referred to as a "diagonal fish-eye system". Thus, the monitoring range or image creation state (composition) varies.

Figure 24:
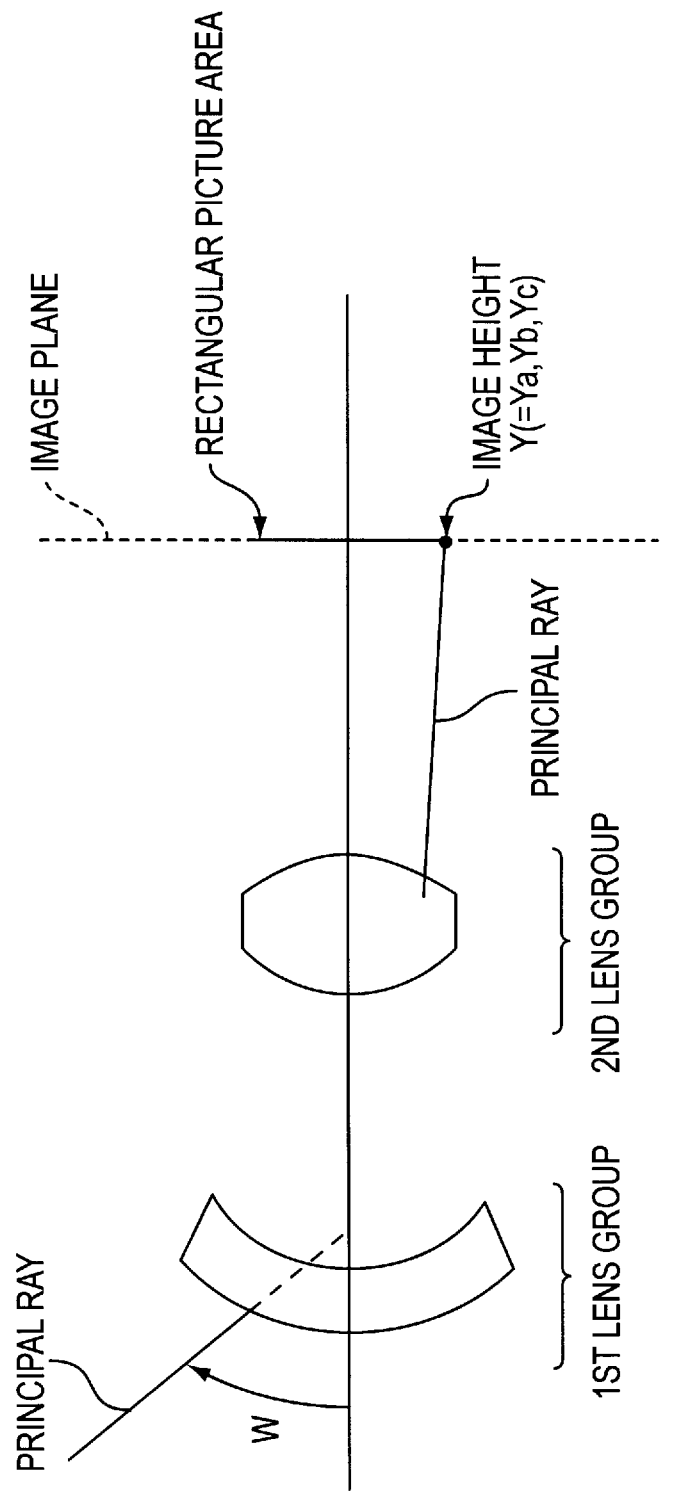
FIG. 24 is a schematic view showing a relationship between half angle view W and an image height Ya, Yb and Yc of a rectangular picture area.

FIG. 24 shows a relationship between a half angle of view and an image height at a rectangular picture area. principal ray incident upon the first lens group at a half angle of view W forms an image at a point Y having an image height Ya, Yb and Yc.

In a lens for a conventional camera, the half-angle of view is represented by the maximum half-angle in the direction of the diagonal Yc extending from the center of the rectangle. On the other hand, in the present invention, "the half-angle of view on the minor side" and "the half-angle of view on the major side" are represented by the half-angle of view in the direction of the lines Ya and Yb passing through the center of the rectangle and extending parallel with the minor side and the major side of the rectangle, respectively.

Figure 21:
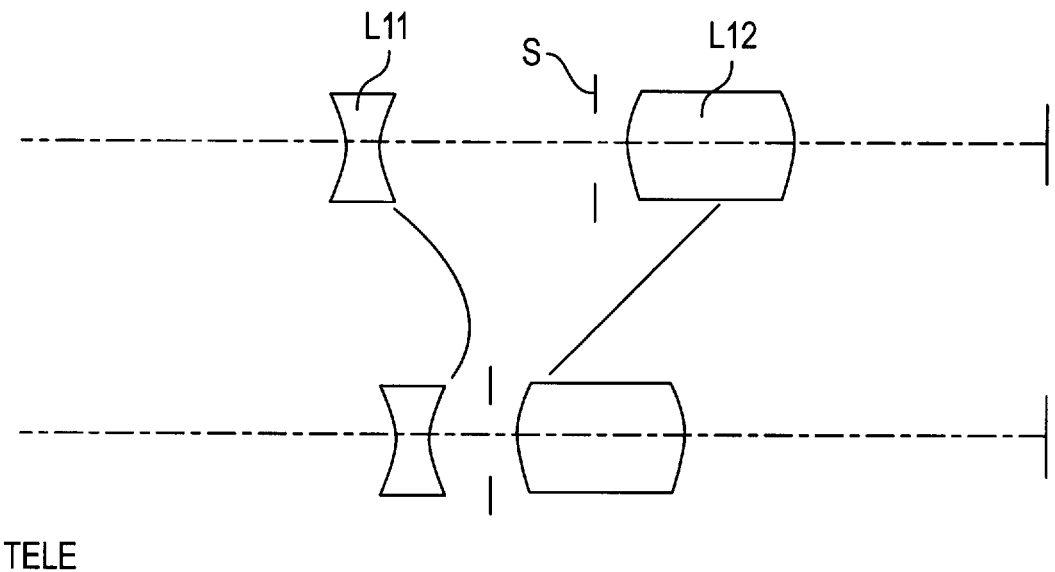
FIG. 21 is a schematic view of loci of the movement of a super wide-angle zoom lens consisting of movable negative and positive lens groups in this order from the object side.
Figure 22:
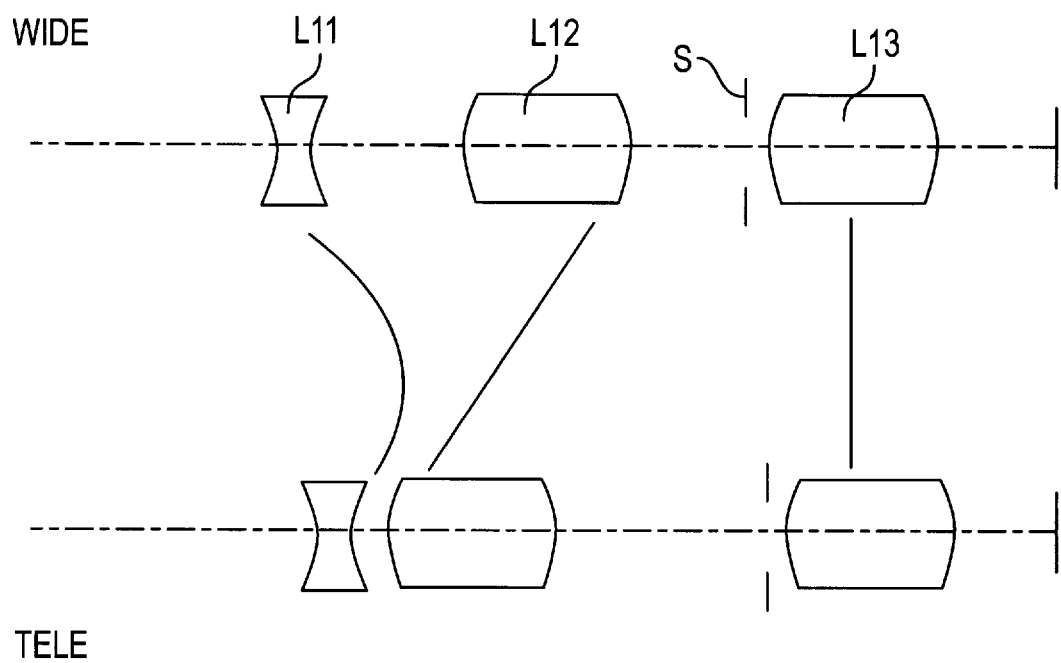
FIG. 22 is a schematic view of loci of the movement of a super wide-angle zoom lens consisting of movable negative and positive lens groups and a stationary positive lens group, in this order from the object side.

FIGS. 21 and 22 show the arrangement of the lens groups of the super wide-angle zoom lens and the loci along which the lens groups are moved during the zooming operation. In FIG. 21, the zoom lens consists of only two lens groups, i.e., a first lens group L11 having negative power, a diaphragm S, and a second lens group L12 having positive power, in this order from the object side (left hand side of FIG. 21). In FIG. 22, the zoom lens consists of a first lens group L11 having negative power, a second lens group L12 having positive power, a diaphragm S and a third lens group L13 having positive power, in this order from the object side. The zooming operation is carried out by moving the first and second lens groups L11 and L12 in the embodiment shown in FIG. 21, and by moving the first and second lens groups L11 and L12 without moving the third lens group L13 in the embodiment illustrated in FIG. 22, respectively. In the embodiments illustrated in FIGS. 21 and 22, the focusing operation is carried out by moving the first lens group L11 in the optical axis direction. The diaphragm S is integrally formed with the second lens group L12 in the embodiment illustrated in FIG. 21 and integral with the third lens group L13 in the embodiment illustrated in FIG. 22. It is possible to provide the diaphragm S in the second lens group L12 or in the third lens group L13 in the embodiment shown in FIG. 21 or FIG. 22, respectively.

The super wide-angle zoom lens according to the embodiments has a half-angle of view equal to or more than 60° on the minor side of the rectangular picture area 20 or equal to or more than 75° on the major side, at the shortest focal length.

Condition (1) specifies the requirement to obtain such a half-angle of view. If the ratio defined in condition (1) is below the lower limit, it is impossible to obtain a large half-angle of view as specified above. If the ratio exceeds the upper limit defined in condition (1), it is difficult to compensate the aberrations produced by the first lens group.

Condition (2) specifies the requirements to obtain a half-angle of view equal to or more than 60° on the minor side of the rectangle, or equal to or more than 75° on the major side, at the shortest focal length. Condition (2) applies to the embodiment illustrated in FIG. 22 in which the zoom lens consists of the negative first lens group L11, the positive second lens group L12, the diaphragm S and the stationary positive third lens group L13, in this order from the object side. If the ratio defined in condition (2) is below the lower limit, it is impossible to obtain the large half-angle of view as specified above.

Condition (3) relates to the focal length of the negative first lens group. The first lens group preferably consists of a negative first lens element, a negative second lens element, and a positive or negative sub-lens group. In this arrangement, if the ratio defined in condition (3) is larger than the upper limit, the curvature of the negative first lens element is too small and it becomes difficult to produce the negative first lens element. Conversely, if the ratio is smaller than the lower limit defined in condition (3), it is impossible to obtain a half-angle of view equal to or more than 60° on the minor side of the rectangular picture area 20, or a half angle of view equal to or more than 75° on the major side thereof.

Embodiments (numerical examples) of the present invention will be discussed below. In the first through fourth embodiments, the zoom lens consists of three lens groups corresponding to FIG. 22. In the fifth embodiment, the zoom lens consists of two lens groups corresponding to FIG. 21. The first lens group L11 consists of a negative first lens element 11-1, a negative second lens element 11-2 and a third cemented sub-lens group (assembly) 11-3, in this order from the object side, in the first through third embodiments and in the fifth embodiment. The cemented lens group 11-3 includes a negative lens element 11-4 and a positive lens element 11-5 cemented thereto, arranged in this order from the object side.

In the fourth embodiment, the first lens group L11 consists of a negative first lens element 11-1 and a second cemented sub-lens group (assembly) 11-6, in this order from the object side. The cemented lens group 11-6 consists of a negative lens element 11-7 on the object side and a positive lens element 11-8 cemented thereto, on the image side. In each embodiment, a neutral density filter ND and a glass cover CG are provided. The neutral density filter ND can be selectively inserted in the light path. When the filter ND is inserted, the amount of light passing therethrough is reduced to, for example, one-third, one-fourth, etc., to thereby increase the substantial diaphragm range. The ND filter may of course reduce the amount of light by some other factor besides one-third or one-fourth. The glass cover CG is located in front of an image pickup surface of an image pickup device (not shown). The surface of the glass cover CG on the image side forms the image forming surface. In the case of a camera using a silver halide film, no glass cover CG is provided.

In the aberration diagrams, "SA" represents the spherical aberration, "SC" represents the sine condition, "d-line", "g-line", and "C-line" represent the chromatic aberrations represented by the spherical aberrations at the respective wavelengths, "S" represents the sagittal rays, and "M" represents the meridional rays.

In the following tables and drawings, "$F_{NO}$" represents the F-number, "F" represents the focal length, "Y" represents the image height, "W" represents the half-angle of view, "Ya" represents the image height of the rectangular picture plane in the minor side direction, "Wa" represents the half-angle of view corresponding to the image height Ya, "Yb" represents the image height of the rectangular picture plane in the major side direction, "Wb" represents the half-angle of view corresponding to the image height Yb, "Yc" represents the image height of the rectangular picture plane in the diagonal direction, "Wc" represents the half-angle of view corresponding to the image height Yc, "$f_B$" represents the back focal distance, "R" represents the radius of curvature, "D" represents the thickness of a lens or the distance between lenses, "Nd" represents the refractive index of the d-line, and "vd" represents the Abbe number of the d-line. In the drawings, the symbol ⊁ denotes a distance which varies upon the zooming operation.

Embodiment 1

Figure 1:
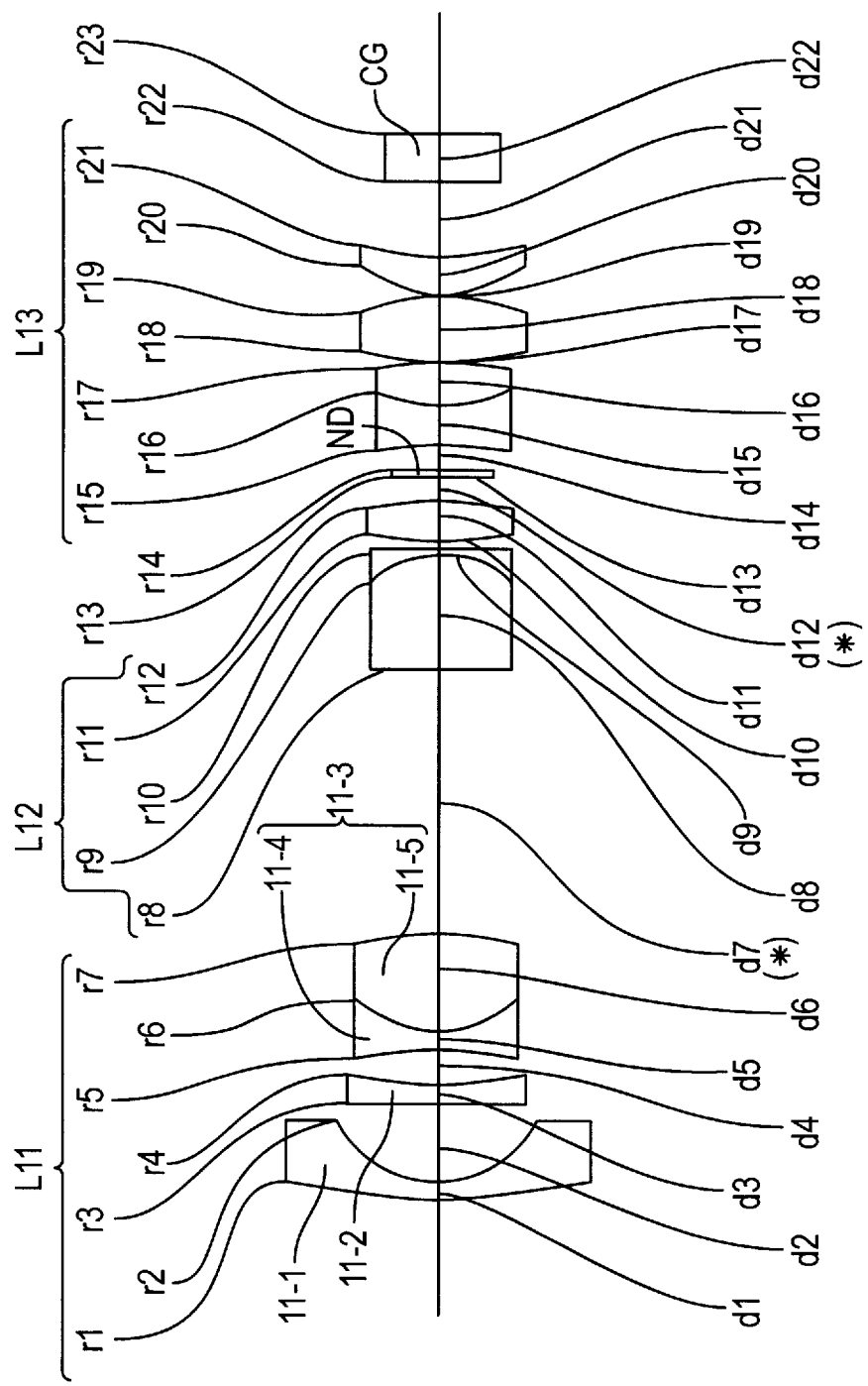
FIG. 1 is a conceptual view of a lens arrangement of a super wide-angle zoom lens, at a shortest focal length extremity, according to a first embodiment of the present invention.

FIGS. 1 through 4 show a first embodiment of the super wide-angle zoom lens according to the present invention. FIG. 1 shows a lens arrangement at the shortest focal length extremity. FIGS. 2A–2D, 3A–3D and 4A–4D show aberration diagrams at the shortest focal length extremity, an intermediate focal length and a longest focal length extremity, respectively. Numerical data regarding the lens system shown in FIG. 1 is shown in Table 1 below.

In this embodiment, the picture area is a ⅓" CCD (major side is 4.8 mm; minor side is approximately 3.6 mm; diagonal is about 6.0 mm). The heights Ya and Yb of the picture plane in the directions of the minor side and the major side are as follows, namely, minor side/2=1.8 mm and major side/2=2.4 mm.

TABLE 1

$f_B = D_{21} + D_{22}/N_{22} = 7.70$ (reduced distance)

| Surface No. | R | D | Nd | $v_d$ |
|---|---|---|---|---|
| 1 | 72.478 | 1.00 | 1.77250 | 49.6 |
| 2 | 7.668 | 5.63 | — | — |
| 3 | -137.710 | 1.26 | 1.60000 | 60.7 |
| 4 | 18.664 | 2.47 | — | — |
| 5 | -20.127 | 1.33 | 1.79348 | 50.6 |
| 6 | 8.000 | 6.78 | 1.75440 | 27.0 |
| 7 | -27.233 | 19.13 – 8.94 – 4.19 | — | — |
| 8 | -53.602 | 8.00 | 1.70000 | 37.1 |
| 9 | -7.267 | 1.03 | 1.85000 | 25.2 |
| 10 | -18.891 | 0.10 | — | — |
| 11 | 33.189 | 2.73 | 1.77250 | 49.6 |
| 12 | -27.409 | 1.64 – 5.09 – 8.20 | — | — |
| 13 | ∞ | 0.50 | 1.51633 | 64.1 |
| 14 | ∞ | 1.70 | — | — |
| 15 | -14.541 | 2.90 | 1.85000 | 31.2 |
| 16 | 11.097 | 3.30 | 1.51032 | 60.5 |
| 17 | -22.765 | 0.10 | — | — |
| 18 | 26.979 | 4.59 | 1.69680 | 55.5 |
| 19 | -15.548 | 0.26 | — | — |
| 20 | 10.011 | 2.50 | 1.77250 | 49.6 |
| 21 | 17.679 | 5.36 | — | — |
| 22 | ∞ | 3.50 | 1.49782 | 66.8 |
| 23 | ∞ | — | — | — |

Embodiment 2

Figure 5:
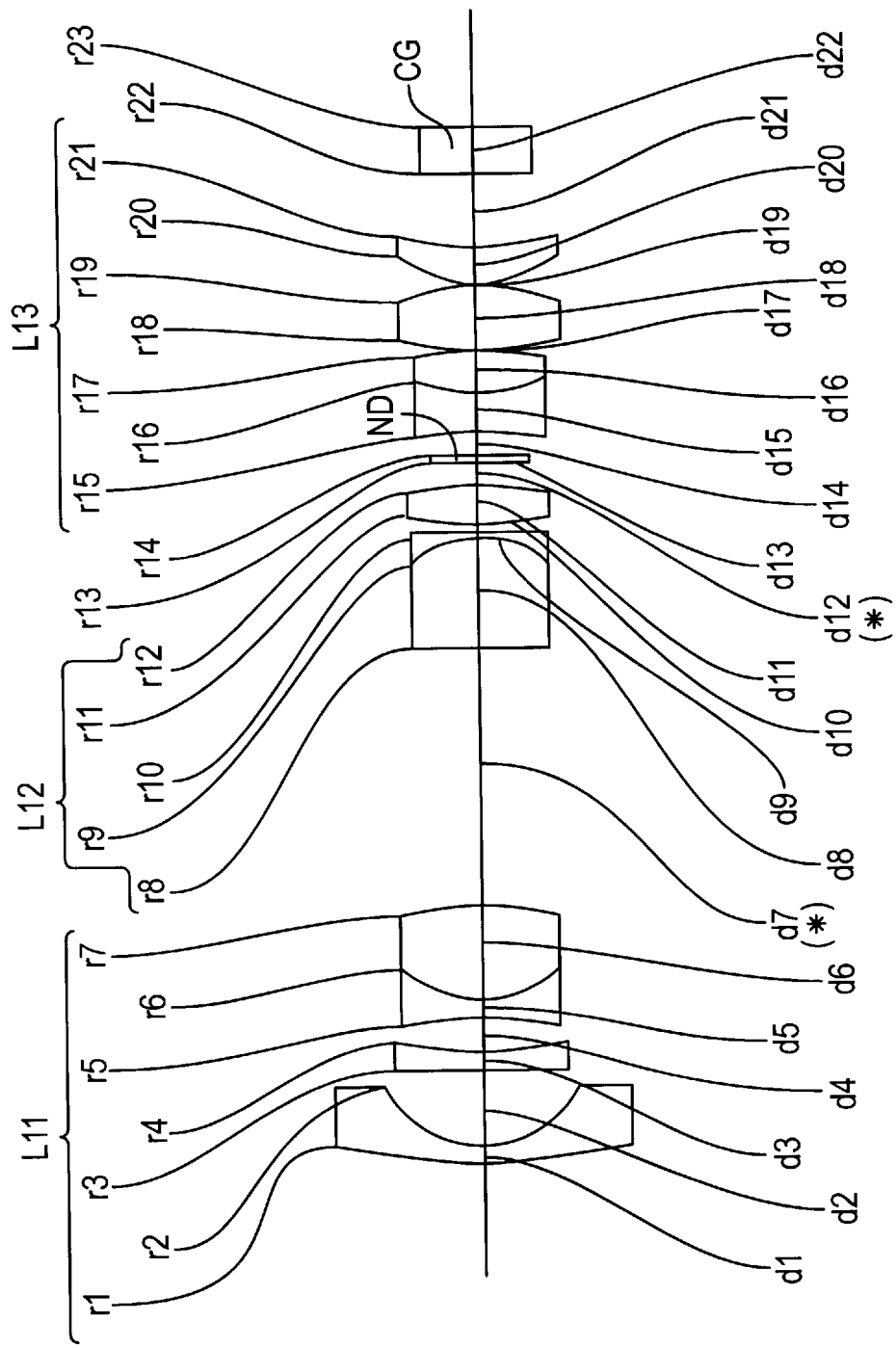
FIG. 5 is a conceptual view of a lens arrangement of a super wide-angle zoom lens, at a shortest focal length extremity, according to a second embodiment of the present invention.
Figure 7A:
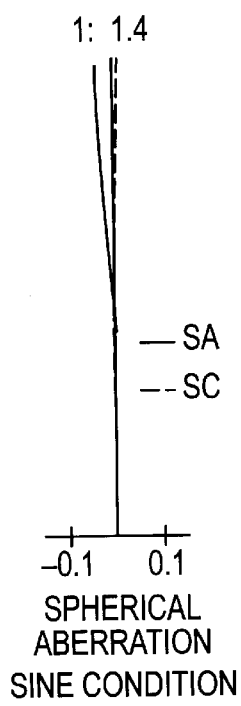
FIGS. 7A through 7D are aberration diagrams of the lens system shown in FIG. 5 at an intermediate focal length thereof.
Figure 7B:
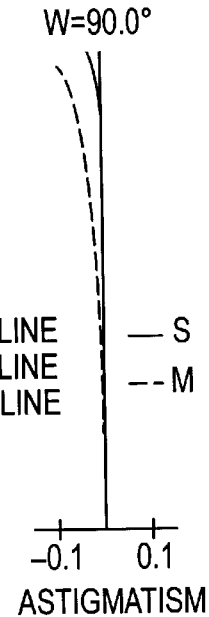
Figure 7C:
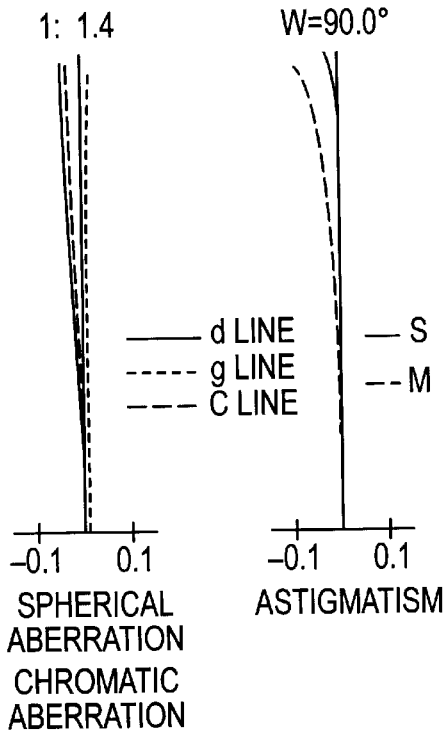
Figure 7D:
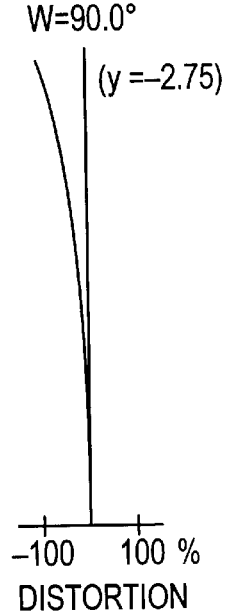
Figure 8A:
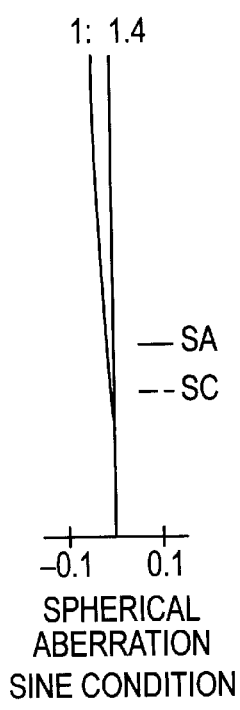
FIGS. 8A through 8D are aberration diagrams of the lens system shown in FIG. 5 at a longest focal length extremity thereof.
Figure 8B:
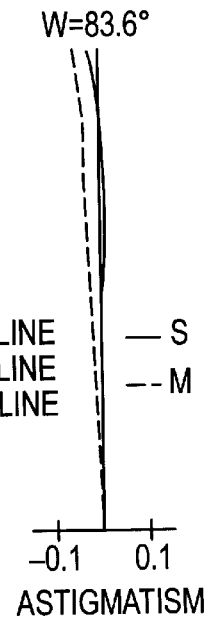
Figure 8C:
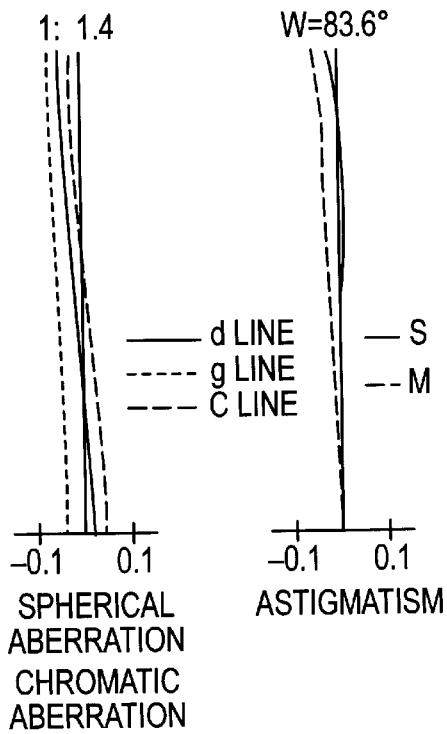
Figure 8D:
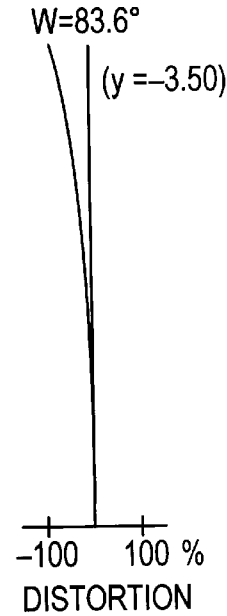

FIGS. 5 through 8 show the second embodiment of a super wide-angle zoom lens according to the present invention. FIG. 5 shows a lens arrangement at a shortest focal length extremity. FIGS. 6A–6D, 7A–7D and 8A–8D show aberration diagrams at the shortest focal length extremity, an intermediate focal length and a longest focal length extremity, respectively. Numerical data regarding the lens system shown in FIG. 5 is shown in Table 2 below.

TABLE 2

$f_B = D_{21} + D_{22}/N_{22} = 7.92$ (reduced distance)

| Surface No. | R | D | $N_d$ | $v_d$ |
|---|---|---|---|---|
| 1 | 75.664 | 1.00 | 1.77250 | 49.6 |
| 2 | 8.053 | 5.71 | — | — |
| 3 | -312.625 | 1.73 | 1.60311 | 60.7 |
| 4 | 28.045 | 2.91 | — | — |
| 5 | -15.775 | 1.93 | 1.80400 | 46.6 |
| 6 | 8.704 | 7.06 | 1.72151 | 29.2 |
| 7 | -21.013 | 18.97 – 8.68 – 3.54 | — | — |
| 8 | -28.537 | 7.60 | 1.70154 | 41.2 |
| 9 | -10.346 | 1.20 | 1.84666 | 23.8 |
| 10 | -17.703 | 0.10 | — | — |
| 11 | 23.358 | 2.51 | 1.77250 | 49.6 |
| 12 | -100.531 | 1.62 – 5.50 – 9.16 | — | — |
| 13 | ∞ | 0.50 | 1.51633 | 64.1 |
| 14 | ∞ | 1.70 | — | — |
| 15 | -16.417 | 2.70 | 1.84666 | 23.8 |
| 16 | 9.452 | 3.80 | 1.64769 | 33.8 |
| 17 | -42.359 | 0.10 | — | — |
| 18 | 27.924 | 4.72 | 1.69680 | 55.5 |
| 19 | -18.319 | 0.10 | — | — |
| 20 | 11.093 | 3.01 | 1.77250 | 49.6 |
| 21 | 27.640 | 5.58 | — | — |
| 22 | ∞ | 3.50 | 1.49782 | 66.8 |
| 23 | ∞ | — | — | — |

Embodiment 3

Figure 9:
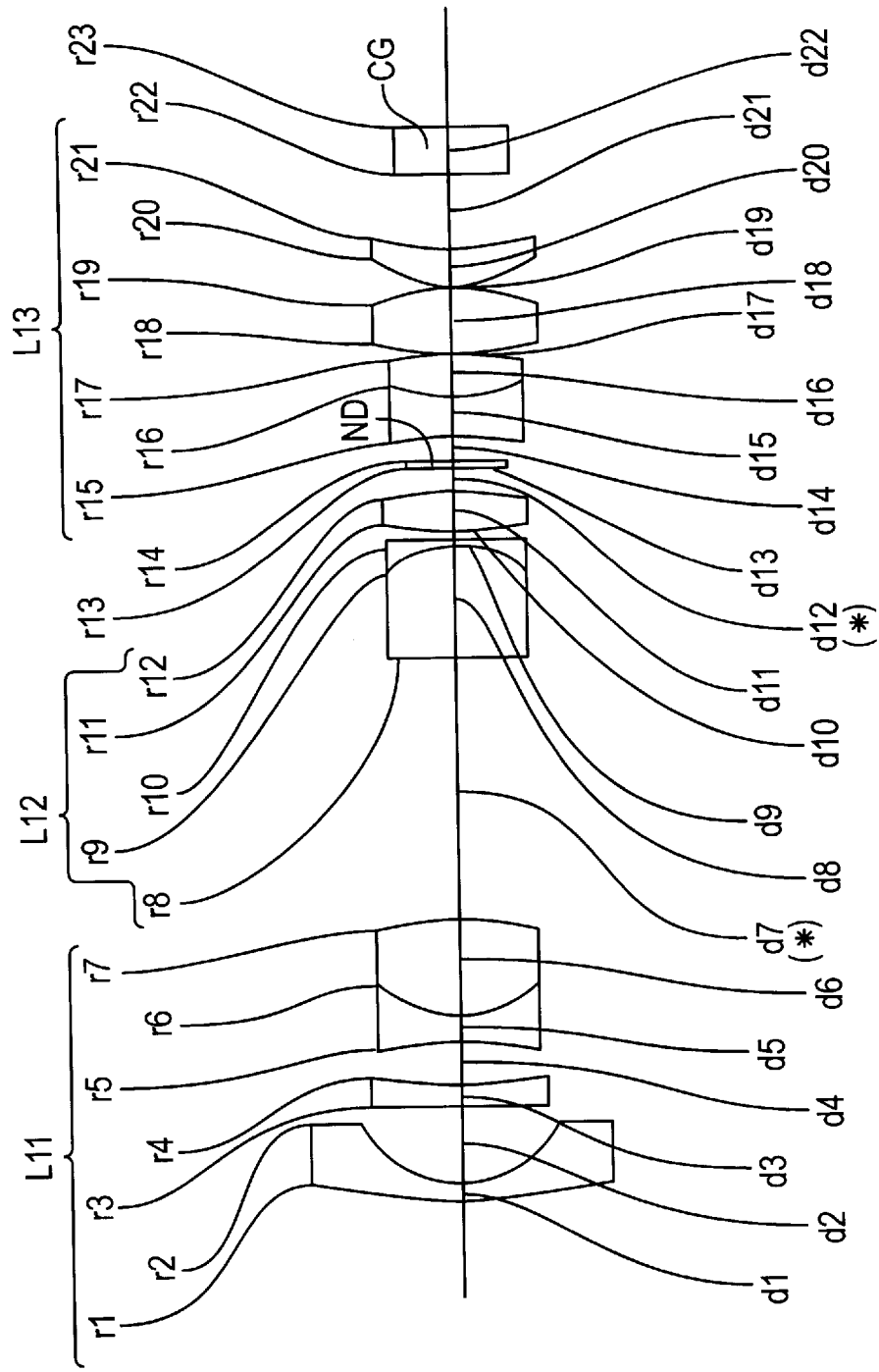
FIG. 9 is a conceptual view of a lens arrangement of a super wide-angle zoom lens, at a shortest focal length extremity, according to a third embodiment of the present invention.

FIGS. 9 through 12 show the third embodiment of a super wide-angle zoom lens according to the present invention. FIG. 9 shows a lens arrangement at a shortest focal length extremity. FIGS. 10A–10D, 11A–11D and 12A–12D show aberration diagrams at the shortest focal length extremity, an intermediate focal length and a longest focal length extremity, respectively. Numerical data regarding the lens system shown in FIG. 9 is shown in Table 3 below.

TABLE 3

$f_B = D_{21} + D_{22}/N_{22} = 8.08$ (reduced distance)

| Surface No. | R | D | $N_d$ | $v_d$ |
|---|---|---|---|---|
| 1 | 85.212 | 1.00 | 1.77250 | 49.6 |
| 2 | 8.102 | 5.71 | — | — |
| 3 | -172.558 | 1.73 | 1.60311 | 60.7 |
| 4 | 32.182 | 2.91 | — | — |
| 5 | -15.229 | 1.93 | 1.80400 | 46.6 |
| 6 | 8.356 | 7.06 | 1.74077 | 27.8 |
| 7 | -21.591 | 20.34 – 8.97 – 2.72 | — | — |
| 8 | -28.110 | 7.60 | 1.70154 | 41.2 |
| 9 | -9.615 | 1.21 | 1.84666 | 23.8 |
| 10 | -17.296 | 0.10 | — | — |
| 11 | 23.921 | 2.51 | 1.77250 | 49.6 |
| 12 | -92.900 | 1.46 – 5.52 – 10.13 | — | — |
| 13 | ∞ | 0.50 | 1.51633 | 64.1 |
| 14 | ∞ | 2.00 | — | — |
| 15 | -15.249 | 2.70 | 1.84666 | 23.8 |
| 16 | 9.847 | 3.80 | 1.64769 | 33.8 |
| 17 | -39.081 | 0.10 | — | — |
| 18 | 27.821 | 4.72 | 1.69680 | 55.5 |
| 19 | -19.160 | 0.10 | — | — |
| 20 | 11.901 | 3.01 | 1.77250 | 49.6 |
| 21 | 40.546 | 5.74 | — | — |
| 22 | ∞ | 3.50 | 1.49782 | 66.8 |
| 23 | ∞ | — | — | — |

Embodiment 4

Figure 13:
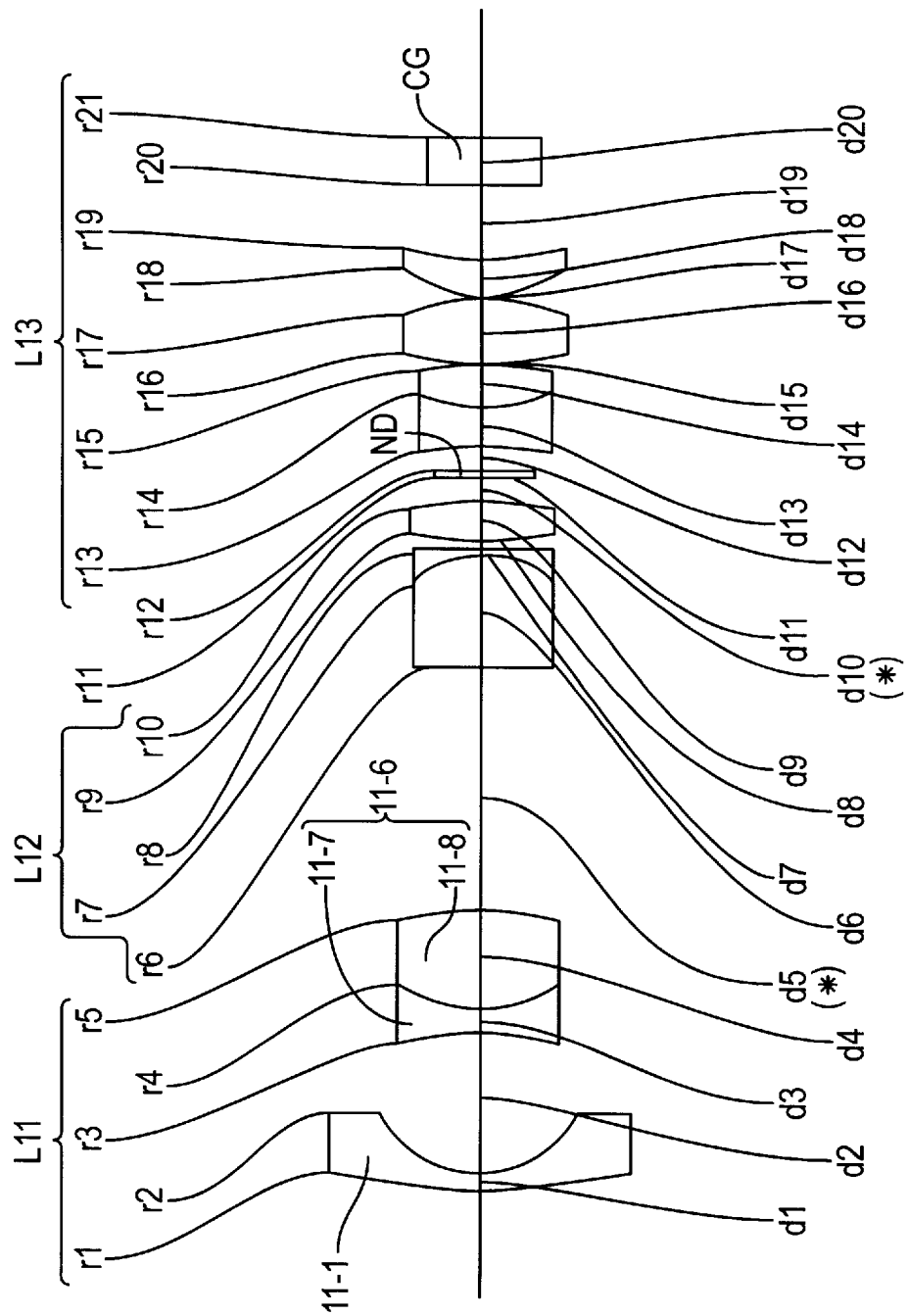
FIG. 13 is a conceptual view of a lens arrangement of a super wide-angle zoom lens, at a shortest focal length extremity, according to a fourth embodiment of the present invention.
Figure 15A:
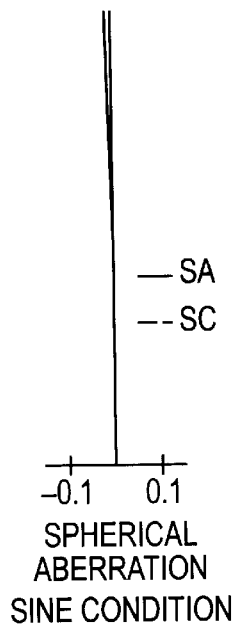
FIGS. 15A through 15D are aberration diagrams of the lens system shown in FIG. 13 at an intermediate focal length thereof.
Figure 15B:
Figure 15C:
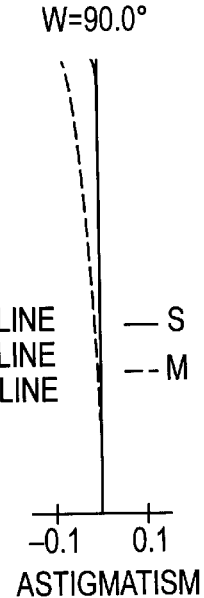
Figure 15D:
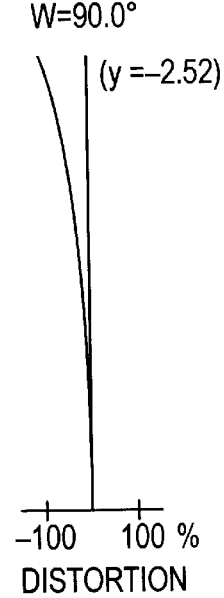
Figure 16A:
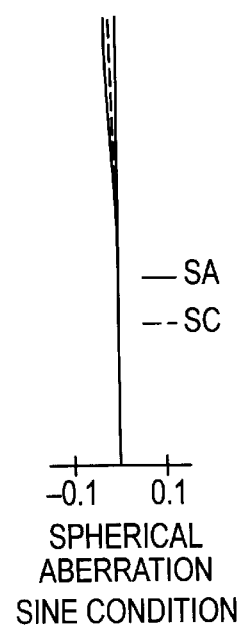
FIGS. 16A through 16D are aberration diagrams of the lens system shown in FIG. 13 at a longest focal length extremity thereof.
Figure 16B:
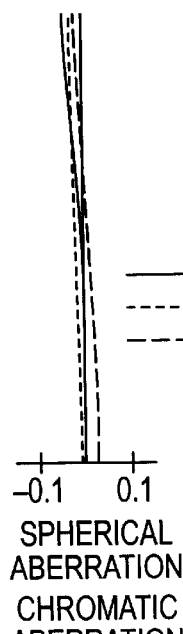
Figure 16C:
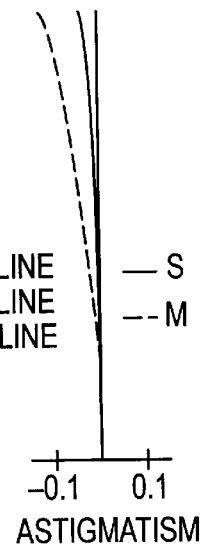
Figure 16D:
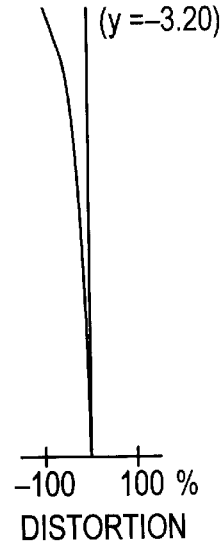

FIGS. 13 through 16 show the fourth embodiment of a super wide-angle zoom lens according to the present invention. FIG. 13 shows a lens arrangement at a shortest focal length extremity. FIGS. 14A–14D, 15A–15D and 16A–16D show aberration diagrams at the shortest focal length extremity, an intermediate focal length and a longest focal length extremity, respectively. Numerical data regarding the lens system shown in FIG. 13 is shown in Table 4 below.

TABLE 4

$F_B = D_{19} + D_{20}/N_{20} = 7.70$ (reduced distance)

| Surface No. | R | D | $N_d$ | $v_d$ |
|---|---|---|---|---|
| 1 | 98.123 | 1.00 | 1.77250 | 49.6 |
| 2 | 8.995 | 10.35 | — | — |
| 3 | -12.239 | 1.93 | 1.80400 | 46.6 |
| 4 | 9.073 | 7.06 | 1.74077 | 27.8 |
| 5 | -22.851 | 18.97 – 11.94 – 6.34 | — | — |
| 6 | -34.240 | 7.60 | 1.70154 | 41.2 |
| 7 | -9.969 | 1.21 | 1.84666 | 23.8 |
| 8 | -17.364 | 0.10 | — | — |
| 9 | 21.921 | 2.51 | 1.77250 | 49.6 |
| 10 | -374.823 | 1.90 – 4.22 – 7.22 | — | — |
| 11 | ∞ | 0.50 | 1.51633 | 64.1 |
| 12 | ∞ | 1.90 | — | — |
| 13 | -15.278 | 2.70 | 1.84666 | 23.8 |
| 14 | 10.546 | 3.80 | 1.64769 | 33.8 |
| 15 | -47.414 | 0.10 | — | — |
| 16 | 24.119 | 4.72 | 1.69680 | 55.5 |
| 17 | -18.574 | 0.10 | — | — |
| 18 | 10.045 | 3.01 | 1.77250 | 49.6 |
| 19 | 19.703 | 5.36 | — | — |
| 20 | ∞ | 3.50 | 1.49782 | 66.8 |
| 21 | ∞ | — | — | — |

Embodiment 5

FIGS. 17 through 20 show the fifth embodiment of a super wide-angle zoom lens according to the present invention.

Figure 17:
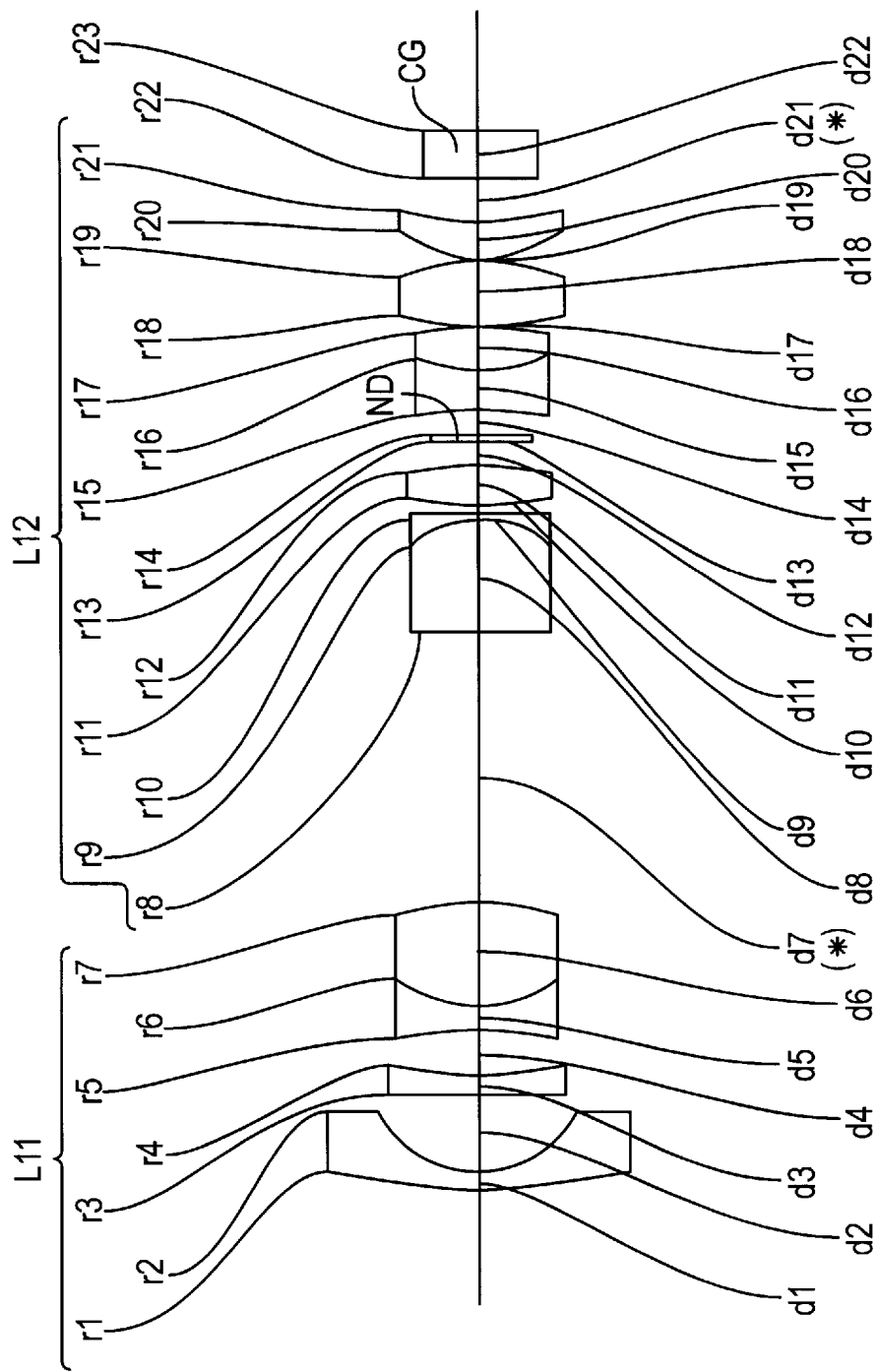
FIG. 17 is a conceptual view of a lens arrangement of a super wide-angle zoom lens, at a shortest focal length extremity, according to a fifth embodiment of the present invention.

FIG. 17 shows a lens arrangement at a shortest focal length extremity. FIGS. 18A–18D, 19A–19D and 20A–20D show aberration diagrams at the shortest focal length extremity, an intermediate focal length and a longest focal length extremity, respectively. Numerical data regarding the lens system shown in FIG. 17 is shown in Table 5 below.

TABLE 5

$f_B = D_{21} + D_{22}/N_{22} = 4.90 - 5.57 - 6.37$ (reduced distance)

| Surface No. | R | D | $N_d$ | $\nu_d$ |
|---|---|---|---|---|
| 1 | 85.090 | 1.01 | 1.77250 | 49.6 |
| 2 | 10.294 | 5.70 | — | — |
| 3 | −61.646 | 1.73 | 1.60311 | 60.7 |
| 4 | 38.745 | 2.91 | — | — |
| 5 | −12.183 | 1.93 | 1.80400 | 46.6 |
| 6 | 8.855 | 7.06 | 1.74077 | 27.8 |
| 7 | −19.820 | 18.97 − 11.19 − 4.70 | — | — |
| 8 | 292.729 | 7.60 | 1.70154 | 41.2 |
| 9 | −10.773 | 1.20 | 1.84666 | 23.8 |
| 10 | −20.276 | 0.10 | — | — |
| 11 | 14.884 | 2.51 | 1.77250 | 49.6 |
| 12 | 174.157 | 1.90 | — | — |
| 13 | ∞ | 0.50 | 1.51633 | 64.1 |
| 14 | ∞ | 1.90 | — | — |
| 15 | −19.479 | 2.70 | 1.84666 | 23.8 |
| 16 | 7.755 | 3.80 | 1.64769 | 33.8 |
| 17 | −41.543 | 0.10 | — | — |
| 18 | 54.109 | 4.72 | 1.69680 | 55.5 |
| 19 | −17.172 | 0.10 | — | — |
| 20 | 12.827 | 3.01 | 1.77250 | 49.6 |
| 21 | 65.826 | 2.56 − 3.23 − 4.03 | — | — |
| 22 | ∞ | 3.50 | 1.49782 | 66.8 |
| 23 | ∞ | — | — | — |

The numerical values of F, $F_{NO}$, W, Y, Wa, Wb, Wc in each embodiment are shown in Table 6 below.

TABLE 6

(Embodiment 1)

| F | 1.61 | 2.40 | 3.11 |
|---|---|---|---|
| $F_{NO}$ | 1.4 | 1.4 | 1.5 |
| W | 90.0° | 90.0° | 79.4° |
| Y | 1.88 | 2.82 | 3.50 |
| Wa(Ya = 1.8) | 80.0° | 45.8° | 34.3° |
| Wb(Yb = 2.4) | — | 65.8° | 47.2° |
| Wc(Yc = 3.0) | — | — | 62.3° |

(Embodiment 2)

| F | 1.65 | 2.40 | 3.11 |
|---|---|---|---|
| $F_{NO}$ | 1.4 | 1.4 | 1.4 |
| W | 90.0° | 90.0° | 86.6° |
| Y | 1.87 | 2.75 | 3.50 |
| Wa(Ya = 1.8) | 80.0° | 46.3° | 34.5° |
| Wb(Yb = 2.4) | — | 67.5° | 47.8° |
| Wc(Yc = 3.0) | — | — | 63.9° |

(Embodiment 3)

| F | 1.60 | 2.40 | 3.30 |
|---|---|---|---|
| $F_{NO}$ | 1.4 | 1.4 | 1.4 |
| W | 90.0° | 90.0° | 75.2° |
| Y | 1.80 | 2.71 | 3.50 |
| Wa(Ya = 1.8) | 90.0° | 46.5° | 62.4° |
| Wb(Yb = 2.4) | — | 68.4° | 44.8° |
| Wc(Yc = 3.0) | — | — | 59.1° |

(Embodiment 4)

| F | 1.92 | 2.44 | 3.11 |
|---|---|---|---|
| $F_{NO}$ | 1.5 | 1.5 | 1.4 |
| W | 90.0° | 90.0° | 89.0° |
| Y | 1.98 | 2.52 | 3.20 |
| Wa(Ya = 1.8) | 69.0° | 47.7° | 35.5° |
| Wb(Yb = 2.4) | — | 76.0° | 50.8° |
| Wc(Yc = 3.0) | — | — | 73.1° |

TABLE 6-continued (Embodiment 5)

| F | 2.22 | 2.63 | 3.11 |
|---|---|---|---|
| $F_{NO}$ | 1.4 | 1.4 | 1.4 |
| W | 90.0° | 90.0° | 82.1° |
| Y | 2.47 | 2.94 | 3.40 |
| Wa(Ya = 1.8) | 51.2° | 41.7° | 34.5° |
| Wb(Yb = 2.4) | 81.7° | 59.6° | 47.9° |
| Wc(Yc = 3.0) | — | — | 64.9° |

Note that in Table 6 the maximum value of W is set at 90° and the maximum value of Y is equal to the diagonal image height plus 0.5. However, the present invention can be applied when W and Y are larger than the respective maximum values.

Table 7 shows the numerical values of relationships (1) through (3) for the above five embodiments.

TABLE 7

| | Embodiment 1 | Embodiment 2 | Embodiment 3 |
|---|---|---|---|
| Relationship(1) | 0.242 | 0.218 | 0.211 |
| Relationship(2) | 2.869 | 2.514 | 2.671 |
| Relationship(3) | 0.610 | 0.699 | 0.711 |

| | Embodiment 4 | Embodiment 5 |
|---|---|---|
| Relationship(1) | 0.225 | 0.271 |
| Relationship(2) | 2.221 | 2.316 |
| Relationship(3) | — | 0.645 |

As can be seen from Table 7, the first through fifth embodiments satisfy the requirements defined by relationships (1) and (2), and the first through third embodiments and the fifth embodiment satisfy relationship (3).

As may be understood from the above discussion, according to the present invention, since the shortest focal length of the zoom lens is set such that if the photographing area is rectangular, at least a part of the peripheral edge of the circular image forming area is contained in the rectangular picture area (photographing area), not only can a wide-angle coverage of the picture plane of a CCTV camera for monitoring be obtained, but also a special image creation effect (composition) can be achieved in a photographing lens.

What is claimed is:

1. A super wide-angle zoom lens comprising at least two lens groups including a first lens group having negative power and a second lens group having positive power, in this order from the object side, wherein a zooming operation is carried out by relatively moving the at least two lens groups, and wherein a photographing area is defined by a rectangular area, at least a part of a boundary of a circular image forming area formed by said zoom lens is disposed in said photographing area at a shortest focal length of said zoom lens, and wherein at a longest focal length, the rectangular photographing area is included within the circular image forming area.

2. The super wide-angle zoom lens according to claim 1, wherein said zoom lens satisfies the following condition;

$$0.1 < f_S / |f_{1G}| < 0.6$$

wherein:

$f_S$ represents a focal length of the entire zoom lens at a shortest focal length extremity, and $f_{1G}$ represents a focal length of said first lens group.

3. The super wide-angle zoom lens according to claim 1, further comprising a diaphragm and a third lens group having positive power, arranged in this order behind said second lens group from said object side, wherein upon zooming said first and second lens groups are moved and no movement of said third lens group takes place, and wherein said zoom lens satisfies the following condition;

$$D_W/|f_{1G}|>1.3$$

wherein:

$D_W$ represents a spatial distance between said first lens group and said second lens group at said shortest focal length extremity.

4. A super wide-angle zoom lens comprising at least two lens groups including a first lens group having negative power and a second lens group having positive power, in this order from the object side, wherein a zooming operation is carried out by relatively moving the at least two lens groups, and wherein a rectangular photographing area is defined, at least a part of a boundary of a circular image forming area formed by said zoom lens is disposed in said photographing area at a shortest focal length of said zoom lens, wherein said first lens group having a negative power comprises a negative first lens element, a negative second lens element, and a third lens subgroup, in this order from the object side, wherein at a longest focal length, the rectangular photographing area is included within the circular image forming area, and wherein said zoom lens satisfies the following condition:

$$0.5<f_{1-2}/f_1<0.9$$

wherein:

$f_{1-2}$ represents a resultant focal length of said first and second lens elements of said first lens group, and $f_1$ represents a focal length of said first lens element of said first lens group.

5. The super wide-angle zoom lens according to claim 4, wherein said third lens sub-group of said first group is made of a cemented lens assembly of a negative lens element and a positive lens element cemented to said negative lens element.

6. The super wide-angle zoom lens according to claim 1, wherein a half-angle of view at said shortest focal length is equal to or greater than 60° on a minor side of said rectangular photographing area.

7. The super wide-angle zoom lens according to claim 1, wherein a half-angle of view at said shortest focal length is equal to or greater than 75° on a major side of said rectangular photographing area.

8. A super wide-angle zoom lens comprising at least two lens groups including a first lens group having negative power and a second lens group having positive power, in this order from the object side, wherein a zooming operation is carried out by relatively moving the at least two lens groups, and wherein a photographing area is defined, at least a part of a boundary of a circular image forming area formed by said zoom lens is disposed in said photographing area at a shortest focal length of said zoom lens, and wherein a portion of said photographing area is outside of said image forming area.

9. A super wide-angle zoom lens comprising at least two lens groups including a first lens group having negative power and a second lens group having positive power, in this order from the object side, wherein a zooming operation is carried out by relatively moving the at least two lens groups, and wherein a photographing area is defined, at least a part of a boundary of a circular image forming area formed by said zoom lens is disposed in said photographing area at a shortest focal length of said zoom lens, wherein said first lens group having a negative power comprises a negative first lens element, a negative second lens element, and a third lens subgroup, in this order from the object side, wherein a portion of said photographing area is outside of said image forming area, and wherein said zoom lens satisfies the following condition:

$$0.5<f_{1-2}/f_1<0.9$$

wherein:

$f_{1-2}$ represents a resultant focal length of said first and second lens elements of said first lens group, and $f_1$ represents a focal length of said first lens element of said first lens group.

10. The super wide-angle zoom lens according to claim 8, wherein said zoom lens satisfies the following condition;

$$0.1<f_S/|f_{1G}|<0.6$$

wherein:

$f_S$ represents a focal length of the entire zoom lens at a shortest focal length extremity, and $f_{1G}$ represents a focal length of said first lens group.

11. The super wide-angle zoom lens according to claim 8, further comprising a diaphragm and a third lens group having positive power, arranged in this order behind said second lens group from said object side, wherein upon zooming said first and second lens groups are moved and no movement of said third lens group takes place, and wherein said zoom lens satisfies the following condition;

$$D_W/|f_{1G}|>1.3$$

wherein:

$D_W$ represents a spatial distance between said first lens group and said second lens group at said shortest focal length extremity.

12. The super wide-angle zoom lens according to claim 9, wherein said third lens sub-group of said first group is made of a cemented lens assembly of a negative lens element and a positive lens element cemented to said negative lens element.

13. The super wide-angle zoom lens according to claim 8, wherein a half-angle of view at said shortest focal length is equal to or greater than 60° on a minor side of said rectangular photographing area.

14. The super wide-angle zoom lens according to claim 8, wherein a half-angle of view at said shortest focal length is equal to or greater than 75° on a major side of said rectangular photographing area.

* * * * *